US012392526B2

United States Patent
Oles et al.

(10) Patent No.: US 12,392,526 B2
(45) Date of Patent: Aug. 19, 2025

(54) ROTATING COLLECTOR RING FOR CENTRIFUGAL SOLAR RECEIVER

(71) Applicant: Heliogen Holdings, Inc., Pasadena, CA (US)

(72) Inventors: Andrew Stephen Oles, Baltimore, MD (US); Lars Oliver Kim Amsbeck, Offenberg (DE)

(73) Assignee: Heliogen Holdings, Inc., Pasadena, CA (US)

( * ) Notice: Subject to any disclaimer, the term of this patent is extended or adjusted under 35 U.S.C. 154(b) by 0 days.

(21) Appl. No.: 18/908,090

(22) Filed: Oct. 7, 2024

(65) Prior Publication Data

US 2025/0116429 A1    Apr. 10, 2025

Related U.S. Application Data

(60) Provisional application No. 63/588,970, filed on Oct. 9, 2023.

(51) Int. Cl.
*F24S 80/30* (2018.01)
*F24S 10/60* (2018.01)
*F24S 20/20* (2018.01)
*F24S 80/40* (2018.01)

(52) U.S. Cl.
CPC .............. *F24S 80/30* (2018.05); *F24S 10/60* (2018.05); *F24S 20/20* (2018.05); *F24S 80/40* (2018.05)

(58) Field of Classification Search
CPC ........ B65G 2814/0282; B65G 2812/14; B65G 69/0458; B65G 69/0441; B04B 2011/086
See application file for complete search history.

(56) References Cited

U.S. PATENT DOCUMENTS

2008/0276929 A1   11/2008   Gerwing et al.

FOREIGN PATENT DOCUMENTS

| CN | 1238389 A | * 12/1999 | ............... C21B 7/18 |
|---|---|---|---|
| JP | 5837981 | 12/2015 | |
| WO | WO 2017/149198 | 9/2017 | |
| WO | WO 2020/165608 | 8/2020 | |
| WO | WO 2022/122203 | 6/2022 | |
| WO | WO-2022122204 A1 | * 6/2022 | ............... F24S 20/20 |

OTHER PUBLICATIONS

International Search Report and Written Opinion issued in PCT Application No. PCT/US2024/050250, mailed Jan. 24, 2025, in 11 pages.

* cited by examiner

*Primary Examiner* — Jorge A Pereiro

(74) *Attorney, Agent, or Firm* — Knobbe, Martens, Olson & Bear, LLP

(57) ABSTRACT

A collector ring assembly can capture particles from a centrifugal solar receiver and reduce a speed of the particles. The collector ring assembly can include a collector ring and a stationary shroud. The collector ring can include a plurality of collection members disposed circumferentially around the collector ring. Each collection member can be formed as a shovel. Each shovel can include a front wall, a bottom wall, a rear wall, an angled shield, a lateral lip, and a top wall. The front wall, the bottom wall, and the rear wall of each shovel can form a trough for collecting the particles. The stationary shroud can be disposed around the collector ring. The stationary shroud can receive and funnel particles exiting from the collector ring.

18 Claims, 25 Drawing Sheets

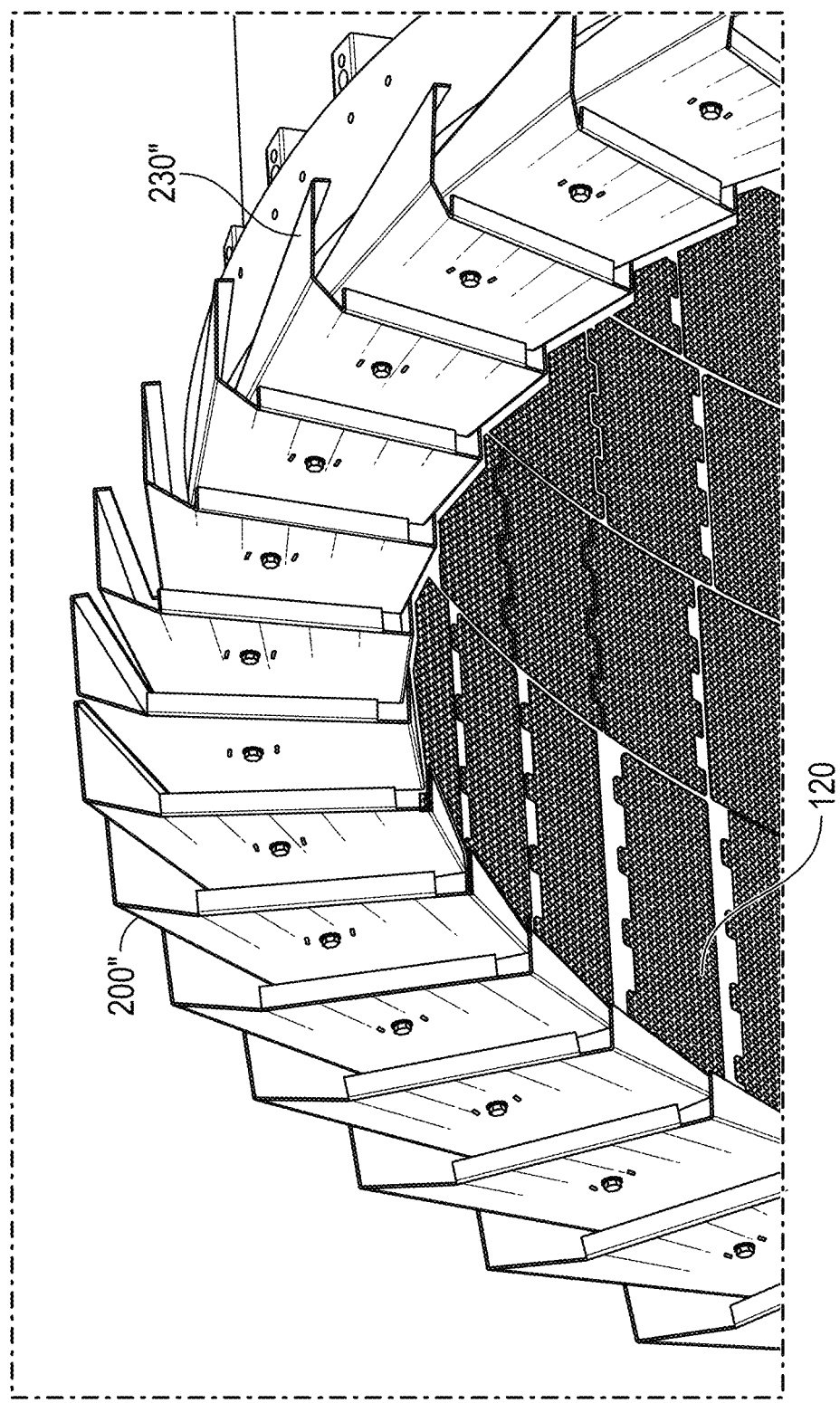

ROTATING COLLECTOR RING FOR CENTRIFUGAL SOLAR RECEIVER

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure is directed to a solar receiver, and more particularly to a rotating collector ring for a centrifugal solar receiver for collecting particles that pass through and are heated in the receiver using solar energy, where the heated particles can thereafter be stored or used (e.g., to provide heat for industrial purposes).

Description of the Related Art

Existing centrifugal solar receivers use stationary collector rings. However, such stationary collector rings result in particle buildup that results in reduction in receiver aperture. Additionally, stationary collector rings are subjected to impacts by the heated particles, creating abrasion of the stationary collector ring that increases wear on the collector ring and attrition of the particles, increasing the operation and maintenance costs of solar receivers with such stationary collector rings.

SUMMARY

In some aspects, the present disclosure provides a collector ring for a centrifugal solar receiver. The collector ring includes a plurality of collection members arranged circumferentially about a central longitudinal axis of the collector ring. The plurality of collection members are configured to capture particles and reduce a speed of the particles.

In some aspects, the plurality of collection members includes a plurality of shovels. Each of the plurality of shovels includes a front wall. a bottom wall extending from the front wall, and a rear wall extending from the bottom wall, wherein the front wall, the bottom wall, and the rear wall define a trough configured to collect particles.

In some aspects, each of the plurality of shovels further include: an angled shield extending from the front wall, the angled shield including an angled surface, wherein the angled shield is configured to direct particles into the trough; a lateral lip extending from the front wall, wherein the lateral lip is configured to capture particles that travel past the angled shield and direct those particles into the trough; and a top wall extending from the front wall.

In some aspects, the rear wall includes a wide portion and a narrow portion.

In some aspects, each of the plurality of shovels is configured to receive particles travelling in a direction from a first end of the shovel to a second end of the shovel, wherein the lateral lip is disposed at the second end of the shovel.

In some aspects, the bottom wall, the top wall, and the lateral lip each extend substantially perpendicular to the front wall.

In some aspects, each of the plurality of shovels is at least partially nested within an adjacent shovel.

In some aspects, the rear wall is angled from the front wall by a tray angle of about 9 degrees.

In some aspects, the top wall is angled from the bottom wall by a mouth angle of about 12.5 degrees.

In some aspects, the plurality of shovels are configured to receive and collect particles from the centrifugal solar receiver when the plurality of shovels are positioned between about 9 o'clock about 4 o'clock along the clockwise rotation cycle of the collector ring, and wherein the plurality of shovels are configured to release particles when the plurality of shovels are positioned between about 6 o'clock and about 9 o'clock along the clockwise rotation cycle of the collector ring In some aspects, the collector ring further includes a stationary shroud disposed around the collector ring, the stationary shroud configured to collect and funnel particles exiting from the collector ring.

In some aspects, the stationary shroud includes a pointed top shelf and a stepped bottom shelf.

In some aspects, the collector ring is configured to rotate with a rotating inliner drum of the centrifugal solar receiver In some aspects, the plurality of collection members includes a plurality of curved vanes.

In some aspects, the collector ring further includes an end wall and a front wall defining an opening aligned with an aperture of the centrifugal solar receiver. The front wall is angled towards the central longitudinal axis of the collector ring. The front wall is spaced from an inliner of the centrifugal solar receiver to form a circumferential gap between the front wall and the inliner via which particles flow from the inliner into the collector ring.

In other aspects, the present disclosure provides a collector ring assembly including a collector ring and a stationary shroud. The collector ring is configured to capture particles from the centrifugal solar receiver and reduce a speed of the particles. The collector ring includes a plurality of shovels arranged circumferentially about a central longitudinal axis of the collector ring. Each of the plurality of shovels includes a front wall, a bottom wall extending from the front wall; a rear wall extending from the bottom wall, wherein the front wall, the bottom wall, and the rear wall define a trough configured to collect particles. The stationary shroud is disposed around the collector ring. The stationary shroud is configured to collect and funnel particles exiting from the collector ring. The stationary shroud includes a pointed top shelf and a stepped bottom shelf.

In some aspects, each of the plurality of shovels further include: an angled shield extending from the front wall, the angled shield including an angled surface, wherein the angled shield is configured to direct particles into the trough; a lateral lip extending from the front wall, wherein the lateral lip is configured to capture particles that travel past the angled shield and direct those particles into the trough; and a top wall extending from the front wall.

In other aspects, the present disclosure provides a collection member of a collector ring for a centrifugal solar receiver. The collection member includes: a front wall; a bottom wall extending from the front wall; a rear wall extending from the bottom wall, the rear wall including a wide portion and a narrow portion, wherein the front wall, the bottom wall, and the rear wall define a trough configured to collect particles; an angled shield extending from the front wall, the angled shield including an angled surface, wherein the angled shield is configured to direct particles into the trough; a lateral lip extending from the front wall, wherein the lateral lip is configured to capture particles that travel past the angled shield and direct those particles into the trough; and a top wall extending from the front wall.

In some aspects, the collection member is configured to receive particles travelling from a first end of the collection member to a second end of the collection member, wherein the lateral lip is disposed at the second end of the collection member.

In some aspects, the bottom wall, the top wall, and the lateral lip each extend substantially perpendicular to the front wall.

BRIEF DESCRIPTION OF THE DRAWINGS

FIG. 10A depicts a partial perspective view of a collector ring of the collector ring assembly of FIG. 9.

DETAILED DESCRIPTION

Figure 1:
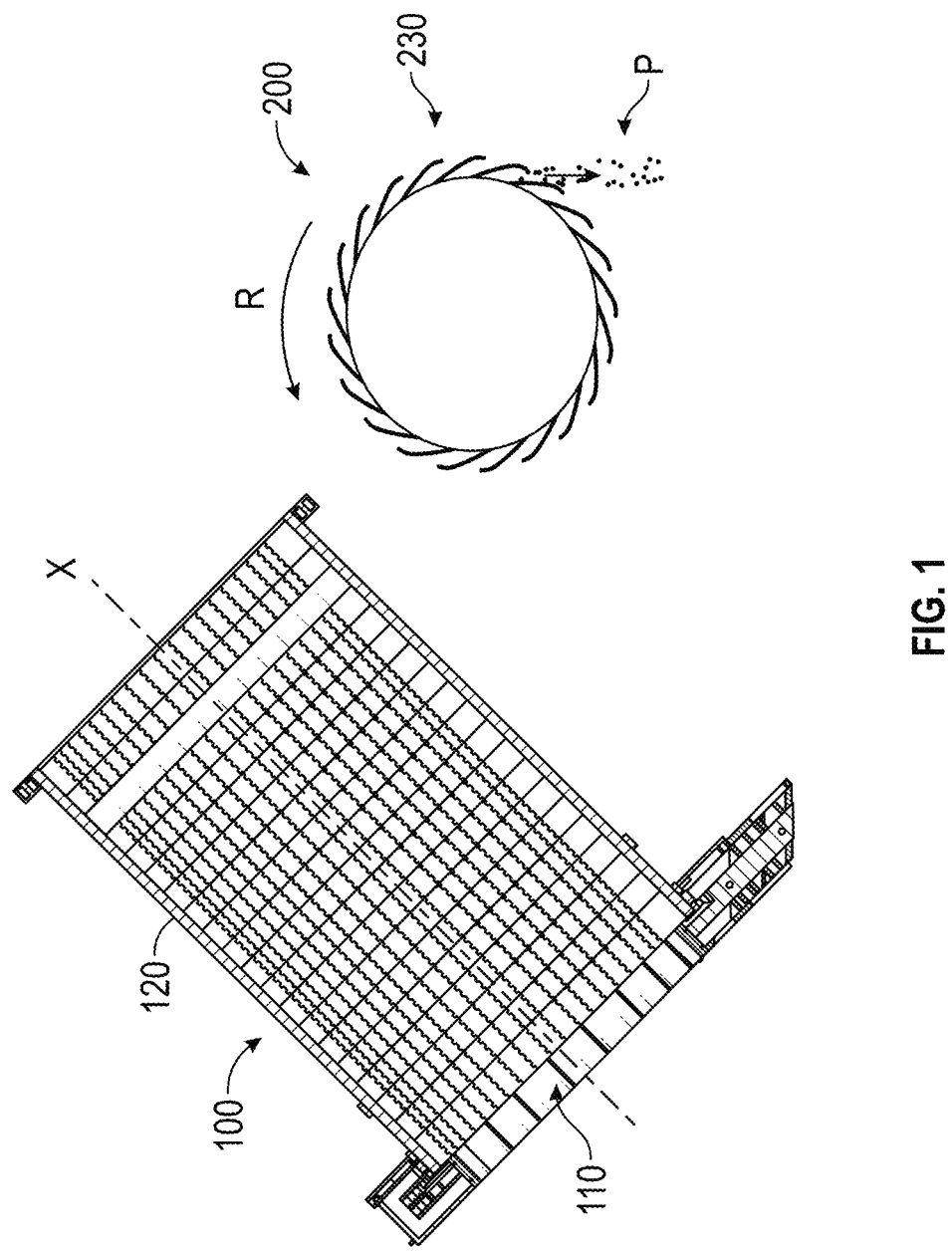
FIG. 1 is a schematic partial cross-sectional view of an inliner for a centrifugal solar receiver and an end view of the inliner with a collector ring.

FIG. 1 is a partial cross-sectional view of a receiver 100 (e.g., centrifugal solar receiver) with an aperture 110 and inliner 120 (e.g., inliner drum), and an end view of a collector ring 200 attached to an inliner 120 of the receiver 100. The collector ring 200 has a plurality of collection members that are circumferentially arranged about an axis X (of the inliner 120) and can capture particles P that travel (e.g., slide, slip) along the receiver 100 (e.g., along the inliner of the receiver 100) toward the aperture 110 while the receiver 100 receives sunlight through the aperture 110 to heat the particles P. As shown in FIG. 1, in one example each of the plurality of collection members can be formed as a vane 230. The collector ring vanes 230 are arranged opposing the direction of rotation R so that as the inliner 120 reaches the upward portion of its rotation, gravity helps to slow the particles P so that they fall with much slower velocity. The collector ring 200 is attached to the inliner 120 so that the collector ring 200 rotates R with the inliner 120 (e.g., rotates R at the same rate as the inliner 120 of the receiver 100).

Figure 2:
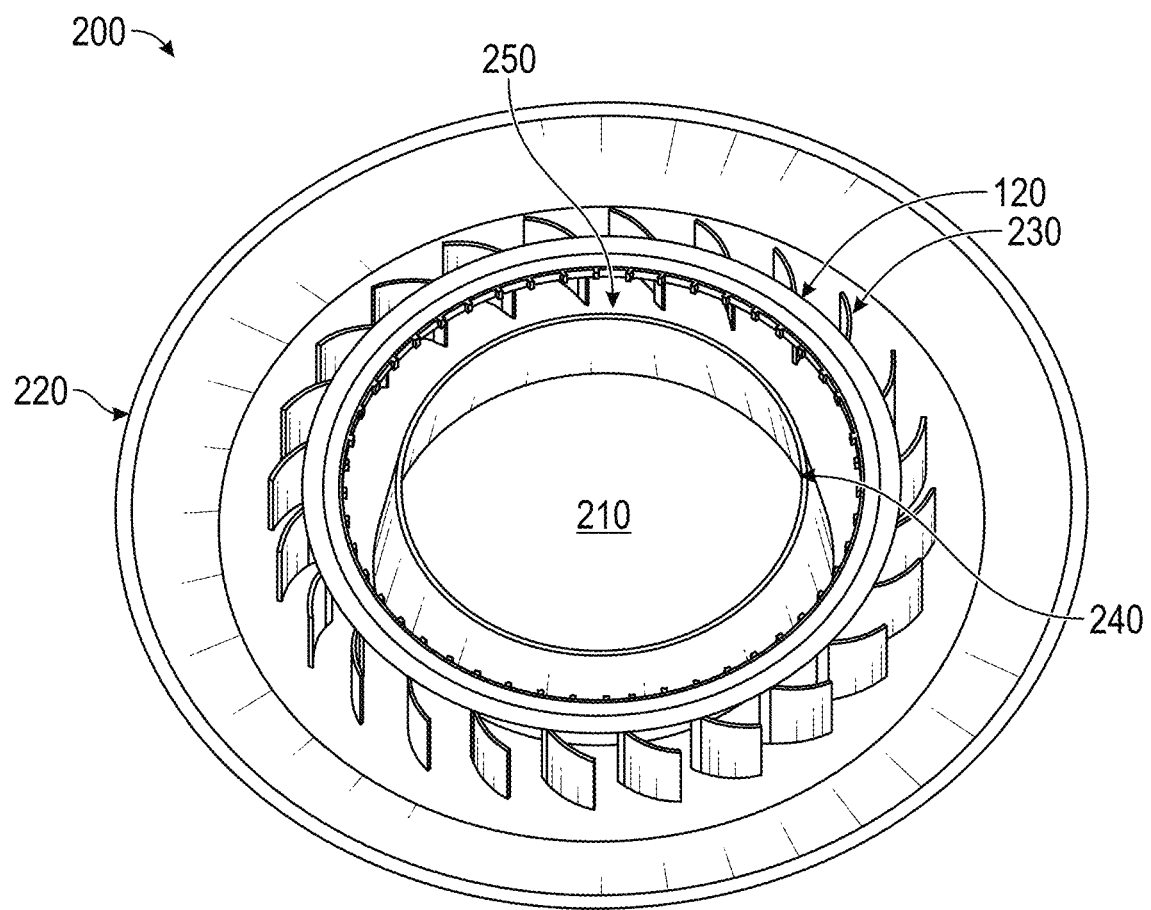
FIG. 2 is a schematic perspective cross-sectional view of a collector ring for a centrifugal solar receiver.
Figure 3:
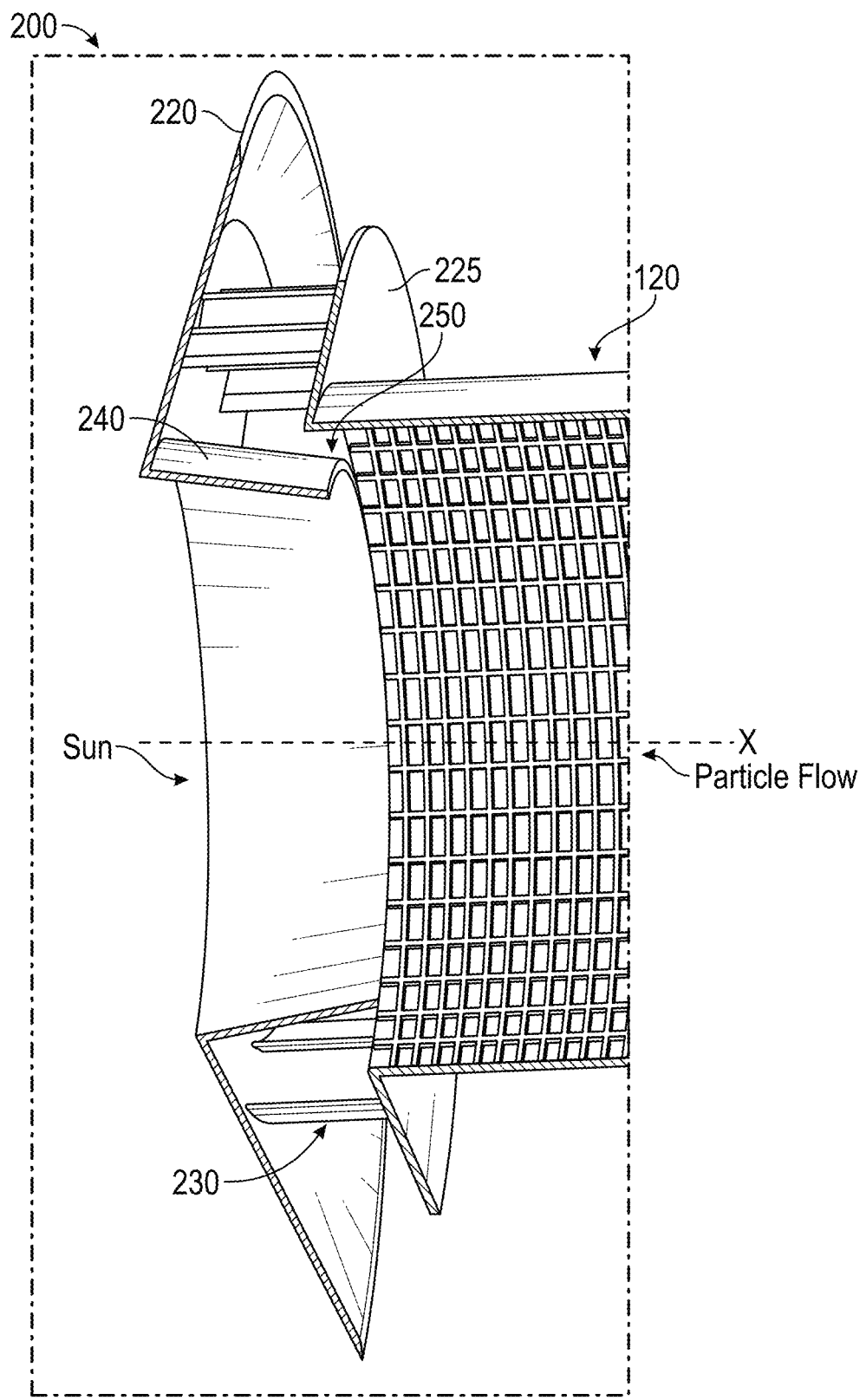
FIG. 3 is a schematic partial cross-sectional view of the collector ring in FIG. 2.

FIG. 2 shows a perspective view and FIG. 3 shows a partial cross-sectional view of the collector ring 200. As discussed above, the collector ring 200 couples or attaches to the inliner 120 (e.g., inliner drum) (best shown in FIG. 3) in a receiver 100 (e.g., centrifugal solar receiver) so that the collector ring 200 rotates with the inliner 120 (e.g., rotates at the same rate as the inliner 120). The collector ring 200 has an opening 210 that aligns with the aperture 110 of the receiver 100 at the front of the receiver 100, and via which sunlight can pass (e.g., toward the inliner 120). The collector ring 200 has an end wall 220 and a front wall 240, where the front wall 240 defines the opening 210. In the illustrated example, the front wall 240 is angled toward the axis X (see FIG. 3) to inhibit (e.g., prevent) particles P from passing through the opening 210 out of the receiver (which could block sunlight coming into the receiver 100). The collector ring 200 includes multiple vanes 230 circumferentially arranged about and spaced from the front wall 240. The vanes 230 are spaced from each other to define a channel between adjacent vanes 230 through which the particles P can pass when they exit the collector ring 200 (described further below). The vanes 230 can have a curved shape and are retained between the end wall 220 and a circumferential flange 225 (see FIG. 3). FIG. 2 shows the end of the inliner 120 that connects to the collector ring 200 (and does not show the circumferential flange 225 in order to show the vanes 230). A circumferential gap 250 or channel is defined between the end of the inliner 120 and the front wall 240 via which particles flow from the inliner 120 into the collector ring 200.

In operation, the particles P move (e.g., slide) from the rear of the receiver 100 (e.g., upper right portion of receiver 100 in FIG. 1) toward the front of the receiver 100 (e.g., lower left portion of receiver 100 in FIG. 1) via rotation of the inliner 120 (e.g., inliner drum). As the particles P reach the end of the inliner 120 (e.g., at the top of the rotation of the inliner 120), the particles P pass via the circumferential gap 250 to the collector ring 200, where the vanes 230 catch and hold the particles P (e.g., without imparting any acceleration centrifugally or rotational inertia to hold the particles against the collector ring 200). The vanes 230 hold the particles P until they fall due to gravity (e.g., when the vane is between a 3 o'clock and a 9 o'clock position as the collector ring 200 rotates with the inliner 120 of the receiver 100), at the bottom of the rotation of the inliner 120, and pass into an outlet chute.

Figure 4:
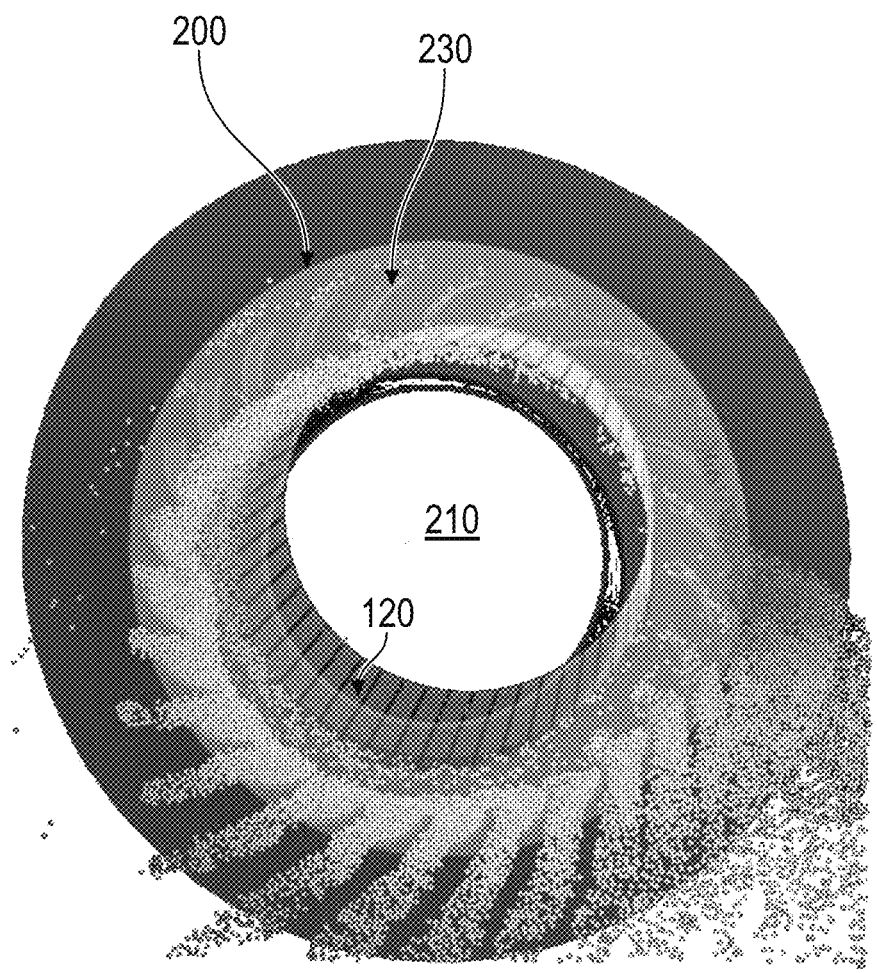
FIG. 4 is an image simulating the operation of a centrifugal solar receiver with the collector ring of FIG. 2 in use.

FIG. 4 shows a simulation of the operation of the collector ring 200 attached to the inliner 120, rotating counter-clockwise, showing particles P being collected by the vanes 230 of the collector ring 200 (e.g., between about 10 o'clock and 2 o'clock in the image) and show particles P falling due to gravity (e.g., between about 3 o'clock and 9 o'clock in the image).

Figure 6:
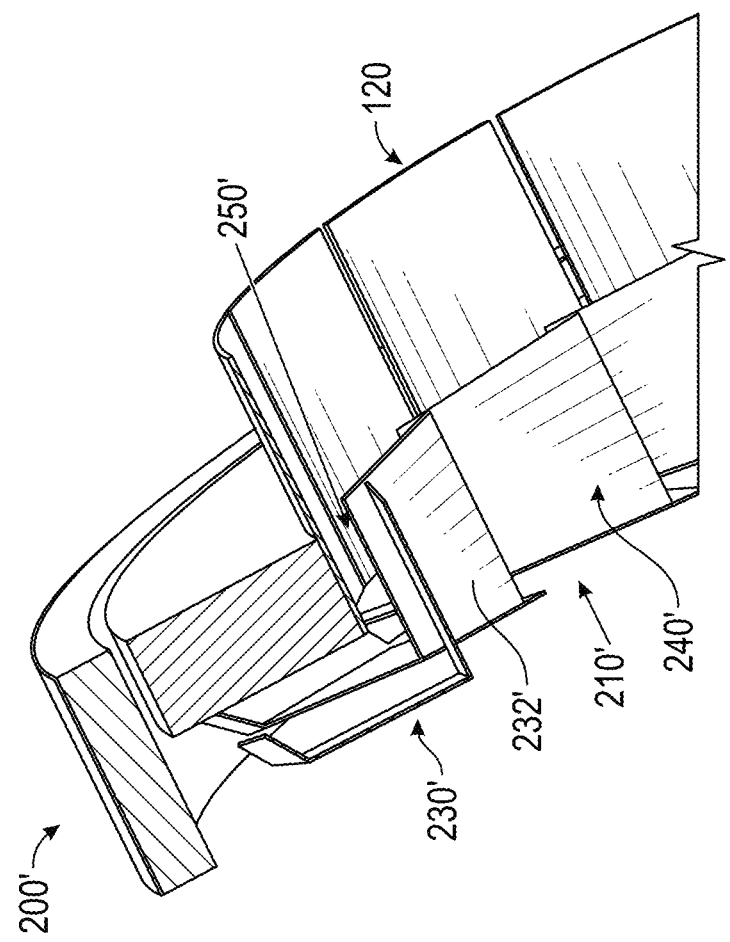
FIG. 6 is a schematic partial cross-sectional view of the collector ring assembly of FIG. 5.
Figure 5:
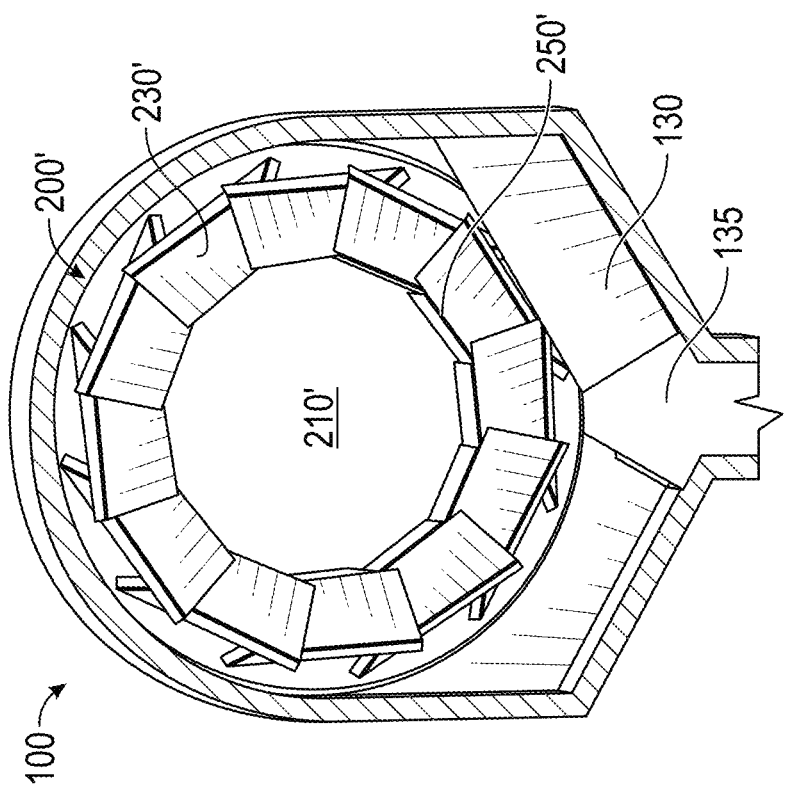
FIG. 5 is a schematic end view of a centrifugal solar receiver with a collector ring assembly coupled to the inliner of the solar receiver.

FIGS. 5-6 show a collector ring 200' of a receiver 100 (e.g., centrifugal solar receiver). The collector ring 200' differs from the collector ring 200 in that it has multiple separate collection members that at least partially overlap each other instead of a single monolithic collector ring 200. In the example shown in FIG. 5, each of the multiple collection members can be formed as a shovel 230'. The shovels 230' are arranged circumferentially about the axis of the inliner 120 of the receiver 100 and each of the shovels 230' separately couples to the inliner 120 or inliner drum (e.g., each shovel 230' couples to a separate tile of an inliner 120 (e.g., inliner drum), facilitating individual replacement of shovels 230' (e.g., without having to replace the whole collector ring 200') for ease of maintenance of the collector ring 200'. Additionally, the individual shovels 230' can expand (e.g., thermal expansion due to heat) relative to other shovels 230' in the collector ring 200' to inhibit (e.g., reduce or prevent) thermal stresses on the shovels 230' or collector ring 200'. Further, overlap of the shovels 230' inhibits (e.g. prevents) particles coming off the drum of the inliner 120 from slipping through any gaps between the shovels 230'. As discussed above, the collector ring 200' rotates with the inliner 120 (e.g., rotates at the same rate as the inliner 120).

The collector ring 200' has an opening 210' that aligns with the aperture 110 of the receiver 100 at the front of the receiver 100, and via which sunlight can pass (e.g., toward the inliner 120 to heat the particles as they move or slip through the inliner 120 toward the front end of the receiver 100). The collector ring 200' has a front wall 240' formed by individual front walls 232' of each of the shovels 230', where the front wall 240' defines the opening 210'. In one example, the front wall 240' is angled (e.g., the individual front walls 232' of the shovels 230' are angled) toward the axis to inhibit (e.g., prevent) particles from passing through the opening 210' out of the receiver (which could block sunlight coming into the receiver 100). A circumferential gap 250' or channel is defined between the end of the inliner 120 and the front wall 240' via which particles flow from the inliner 120 into the collector ring 200'. The shovels 230' can be made of sheet metal (e.g., by bending sheet metal). Advantageously, the collector ring 200' does not reduce the aperture 110 of the receiver 100 (e.g., centrifugal solar receiver) substantially, and provides an improved aperture size as compared with a stationary collector ring. In one example, the collector ring 200' can have an opening 210' of about 2.9 to 3 m in diameter, whereas a stationary collector ring may have an opening diameter of 2.6 m, so the collector ring 200' advantageously provides about 25% increase in area for the aperture 110.

Figure 7A:
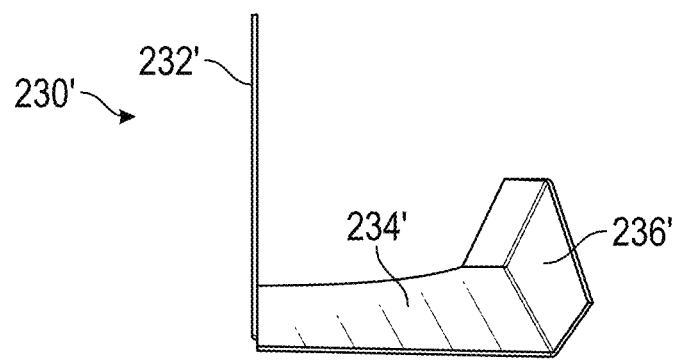
FIG. 7A is a schematic rear view of a shovel of the collector ring assembly in FIG. 5.
Figure 7B:
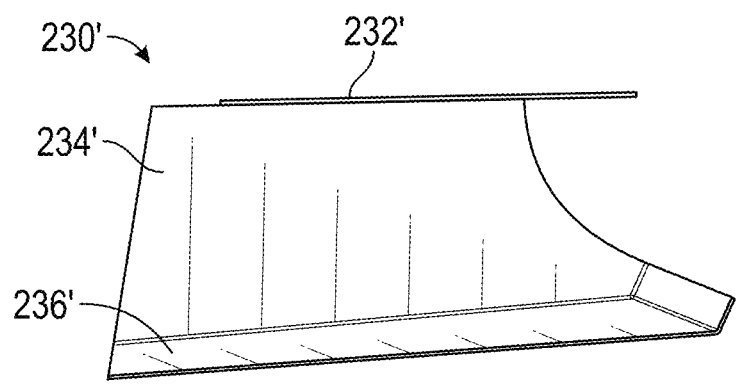
FIG. 7B is a schematic top view of the shovel in FIG. 7A.
Figure 7C:
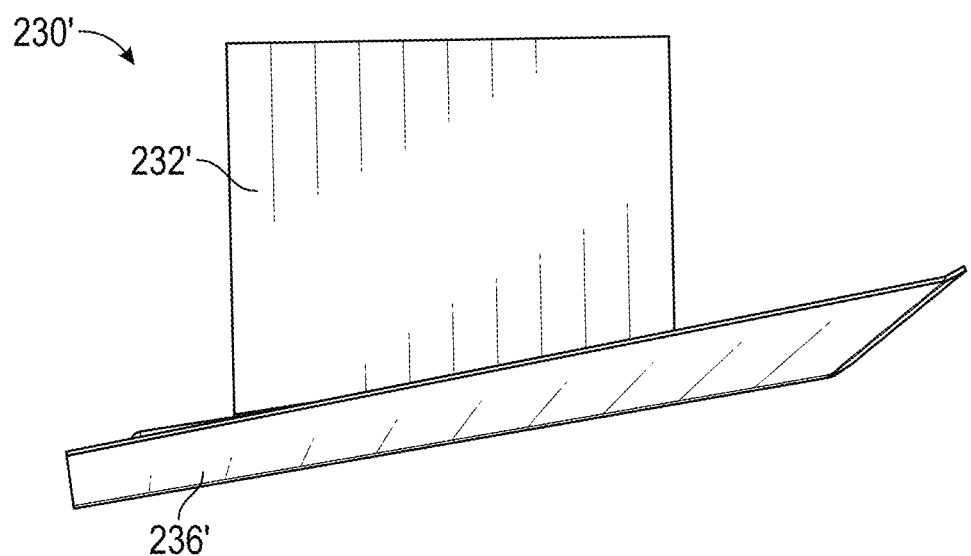
FIG. 7C is a schematic side view of the shovel in FIG. 7A.

FIGS. 7A, 7B and 7C show a front, top and side view, respectively of a shovel 230'. The shovel 230' has the front wall 232', a bottom wall 234' that extends from the front wall 232' to a rear wall 236'. The rear wall 236' can be angled toward the front wall 232'. Also, as best shown in FIG. 7C, the bottom wall 234' can be angled up toward the distal edge of the shovel 230', which allows the shovel 230' to retain the particles as the inliner 120 rotates to that the particles travel (e.g., slide, slip) toward the distal edge before falling off the shovel 230' under gravity into a shroud 130 (see FIG. 5), where particles and move (e.g., roll) in to an outlet chute 135 in communication with the shroud 130. The shroud 130 can be stationary (e.g., does not rotate with the inliner 120).

In operation, the particles P move (e.g., slide) from the rear of the receiver 100 toward the front of the receiver via rotation of the inliner 120. As the particles P reach the end of the inliner 120 (at the top of the rotation of the inliner 120), the particles P pass via the circumferential gap 250' to the collector ring 200', where the shovels 230' catch and hold the particles P (e.g., without imparting any acceleration centrifugally or rotational inertia to hold the particles against the collector ring 200'). The shovels 230' contain the particles as they continue to spin with the inliner 120, allowing the particles P to slide on the shovel surface (e.g., on the bottom wall 234') towards the end of the shovel 230'. When the particles P reach the end of the shovels 230', the particles P begin to slide off the edge of the shovels 230' due to rotational momentum and gravity direction relative to the shovel surface. The shovels 230' hold the particles P until they fall due to gravity (e.g., when the vane is between a 3 o'clock and a 9 o'clock position as the collector ring 200' rotates with the inliner 120 of the receiver 100), at the bottom of the rotation of the inliner 120, and pass into the outlet chute 135 via the shroud 130.

Figure 8:
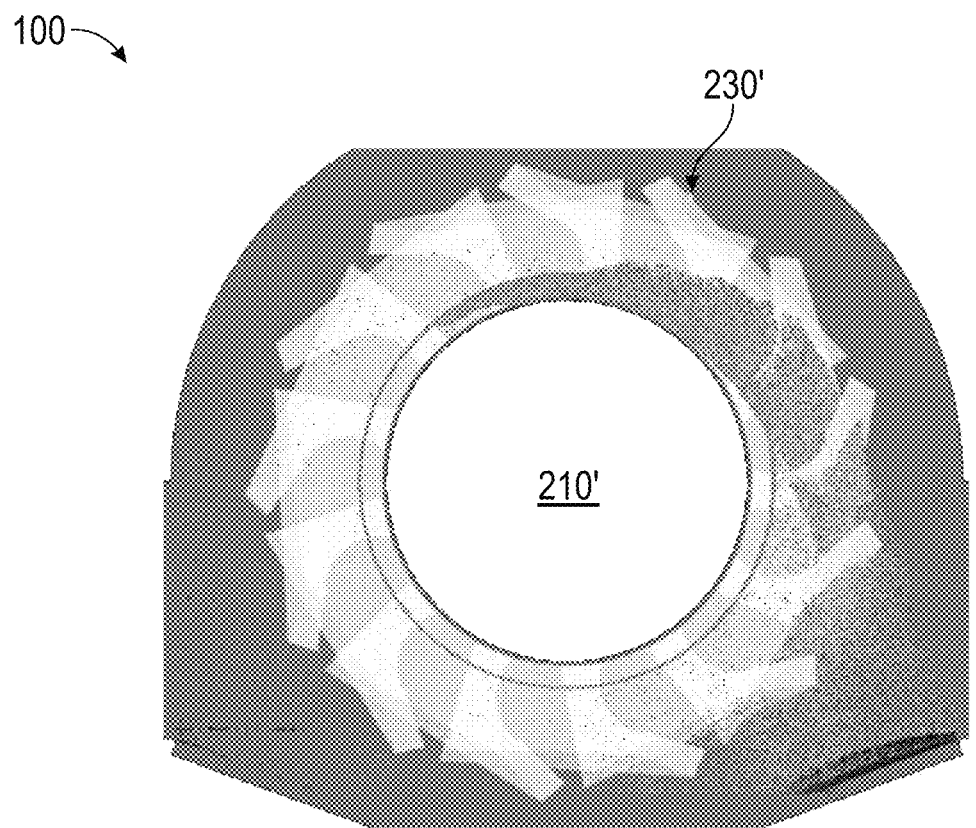
FIG. 8 is an image simulating the operation of a centrifugal solar receiver with the collector ring of FIG. 5.

FIG. 8 shows a simulation of the operation of the collector ring 200' attached to the inliner 120, showing particles P being collected by the shovels 230' of the collector ring 200' (e.g., between about 2 o'clock and 9 o'clock in the image) and show particles P falling due to gravity (e.g., between about 3 o'clock and 9 o'clock in the image) as the inliner 120 and shovels 230' rotate clockwise in the shown orientation.

FIGS. 9-20B depict various aspects of an example collector ring assembly 150" for a receiver 100 (e.g., centrifugal solar receiver). The collector ring assembly 150" can be coupled to an end of the inliner 120 of the receiver 100. The collector ring assembly 150" can collect (e.g., capture) particles P from the inliner 120 (e.g., inliner drum) and reduce a speed of the particles P. The collector ring assembly 150" can direct the particles P out of the collector ring assembly 150" for storage in a thermal energy storage or for use in one or more industrial processes (e.g., to generate electricity, generate steam, facilitate calcination, facilitate a chemical process, etc.).

Figure 9:
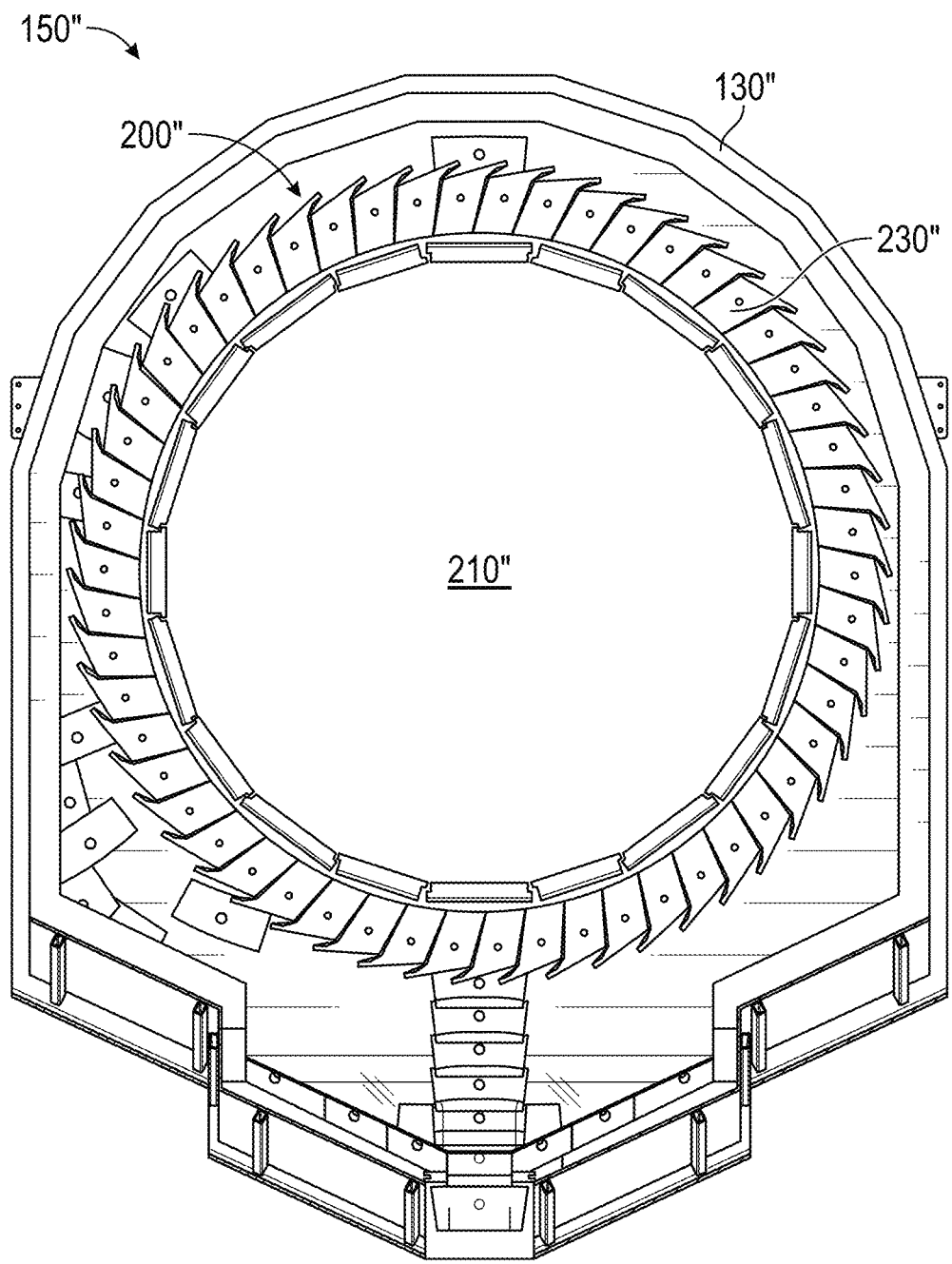
FIG. 9 depicts a transverse cross-sectional view of a collector ring assembly.

FIG. 9 depicts a transverse cross-sectional view of the collector ring assembly 150". As shown in FIG. 9, the collector ring assembly 150" can include a collector ring 200" and a shroud 130" (e.g., disposed about the collector ring assembly 150"). The collector ring 200" can rotate with the inliner 120 (e.g., rotate at the same rate as the inliner 120). The collector ring 200" can include an opening 210" that aligns with the aperture 110 of the receiver 100 at the front of the receiver 100, and via which sunlight can pass (e.g., toward the inliner 120 to heat the particles P as they move or slip through the inliner 120 toward the front end of the receiver 100). The collector ring 200" can include a plurality of collection members. Each of the plurality of collection members can be formed as a shovel 230". The plurality of shovels 230" can be arranged circumferentially about the central longitudinal axis X of the inliner 120 of the receiver 100. As shown in FIG. 9, the plurality of shovels 230" can collectively form a substantially annular shape. Each of the shovels 230" can be separately coupled to the collector ring assembly 150" or to the inliner 120 (e.g., each shovel 230" can be coupled to a separate tile of an inliner 120), facilitating individual replacement of shovels 230" (e.g., without having to replace the whole collector ring 200") for ease of maintenance of the collector ring 200".

Figure 10B:
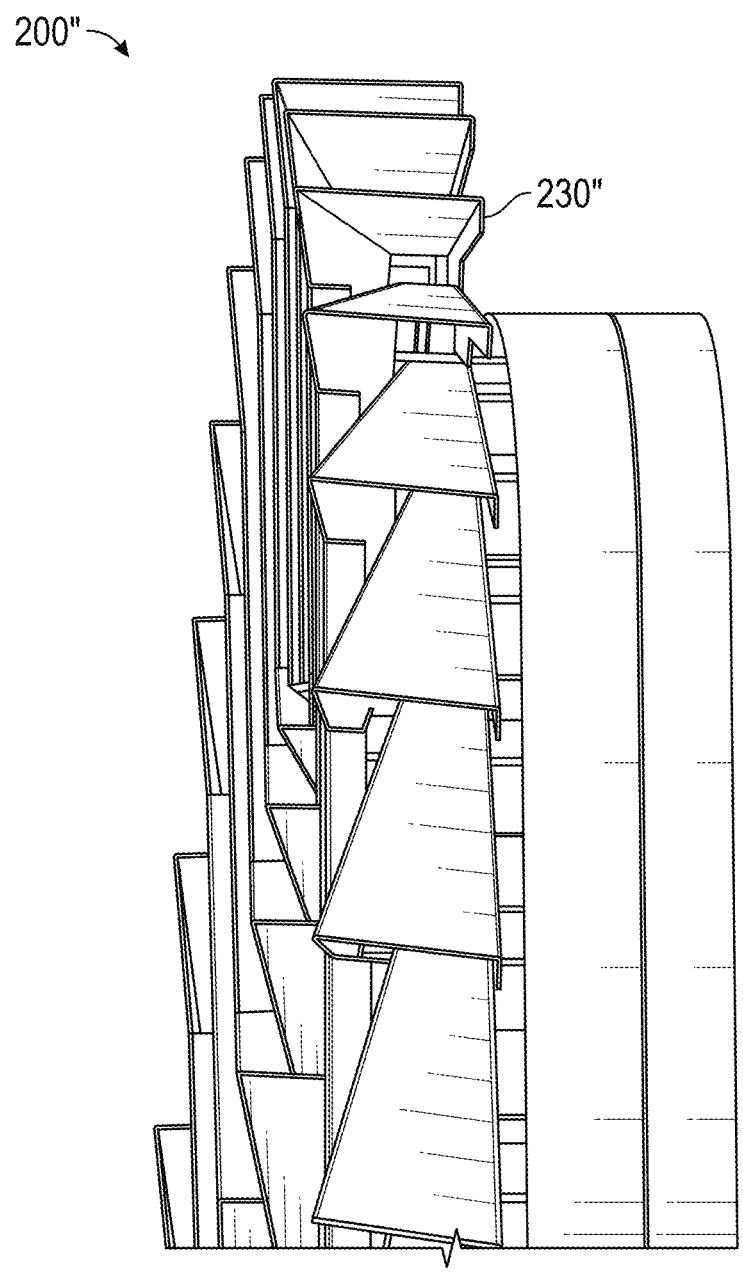
FIG. 10B depicts a partial side view of the collector ring of FIG. 10A.

FIG. 10A depicts a partial perspective view of the collector ring 200" with the shroud 130" removed for clarity. FIG. 10B depicts a partial side view of the collector ring

Figure 10C:
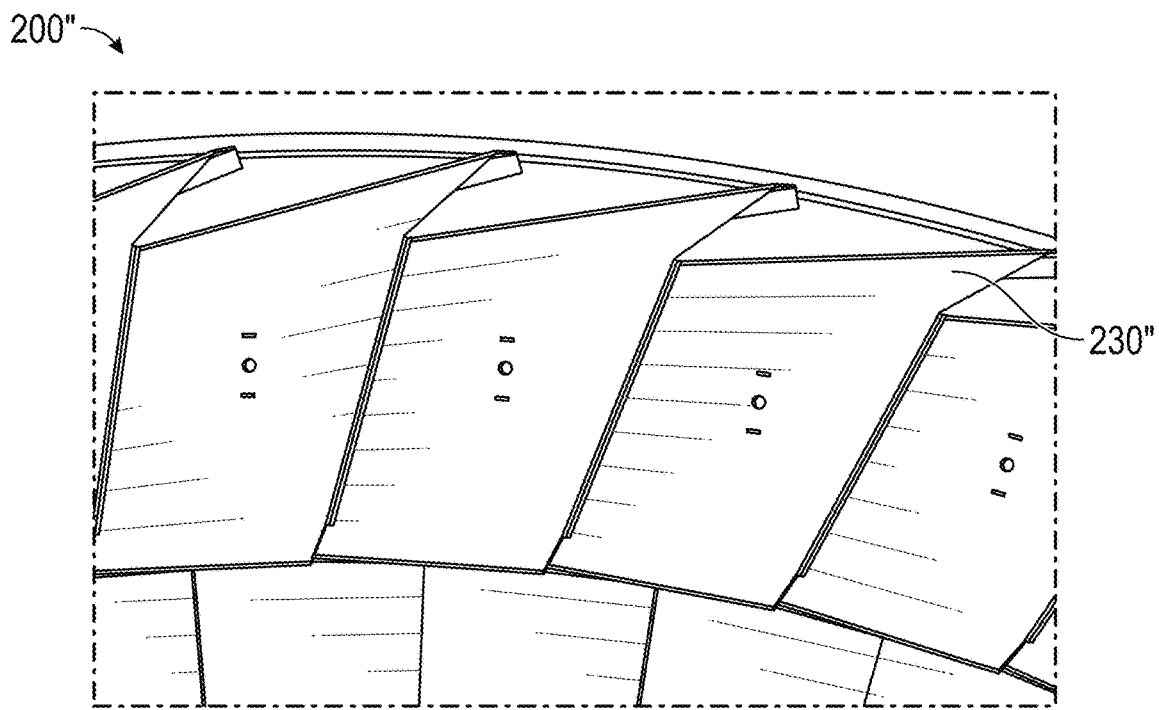
FIG. 10C depicts a partial front view of the collector ring of FIG. 10A.
Figure 10D:
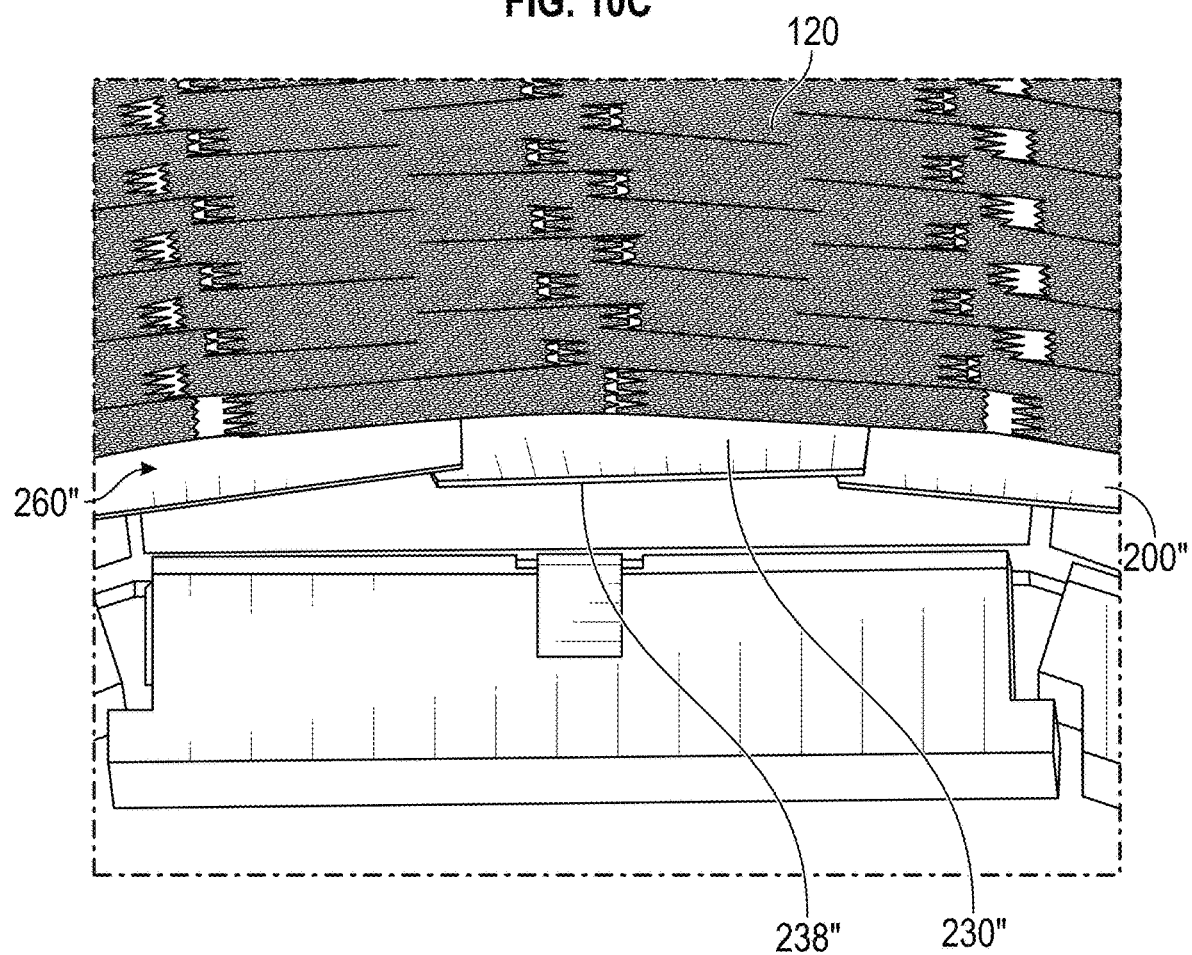
FIG. 10D depicts a partial interior view of the collector ring of FIG. 10A and inliner.

200" with the shroud 130" removed for clarity. FIG. 10C depicts a partial front view of the collector ring 200" with the shroud 130" removed for clarity. FIG. 10D depicts a partial interior view of the collector ring 200" of FIG. 10A and inliner 120 (e.g., inliner drum). As shown in FIGS. 10A-10D, the plurality of shovels 230" can at least partially overlap each other (e.g., each shovel 230" can be at least partially nested within an adjacent shovel 230"). Overlap of the shovels 230" can inhibit (e.g. prevent) particles P coming off the drum of the inliner 120 from slipping through any gaps between the shovels 230". Additionally, each shovel 230" can expand (e.g., thermally expand due to heat) relative to other shovels 230" in the collector ring 200" to inhibit (e.g., reduce or prevent) thermal stresses on the shovels 230" or collector ring 200". Referring to FIG. 10D, the collector ring 200" can be sized and positioned such that top wall 238" of each shovel 230" is spaced radially inwardly from the inliner 120. Accordingly, a radial circumferential gap 260" or channel can be defined between the inner surface of the inliner 120 and a top wall 238" of each shovel 230". Particles P can flow from the inliner 120 into the collector ring 200" via the radial circumferential gap 260". The shovels 230" can be made of sheet metal (e.g., by bending sheet metal). In other examples, the shovels 230" can be made of any suitable material, including but not limited to metal, metal alloys, composite materials, or the like. The shovels 230" can retain the particles P as the inliner 120 rotates so that the particles P travel (e.g., slide, slip) toward the distal edge (e.g., second end 248", shown in FIGS. 11A-11B) before falling off the shovel 230" under gravity into a shroud 130" (see FIG. 12), where particles P can move (e.g., roll or slide) into an outlet chute 135 in communication with the shroud 130".

Figure 11A:
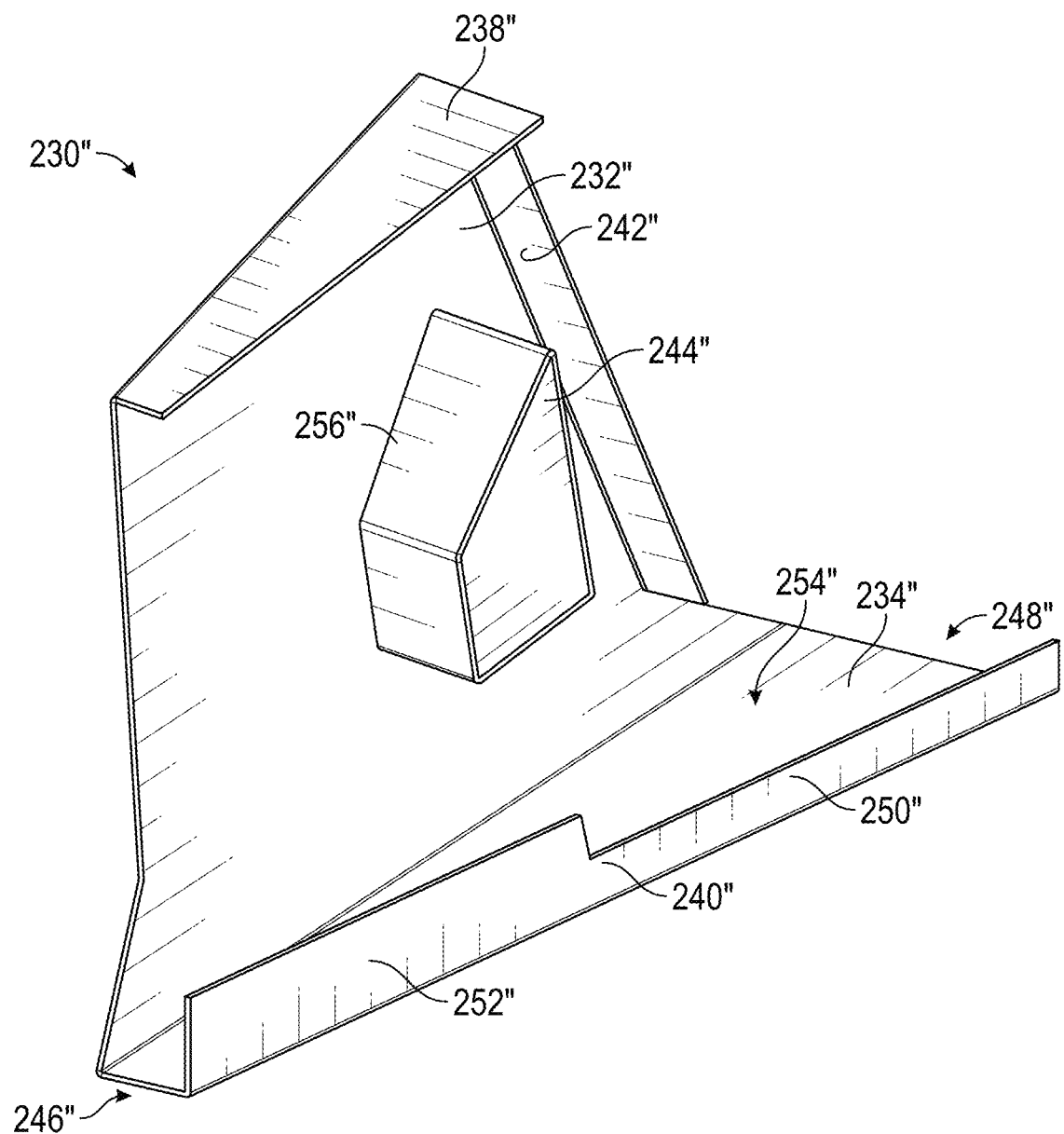
FIG. 11A depicts a perspective view of a shovel of the collector ring assembly of FIG. 9.
Figure 11B:
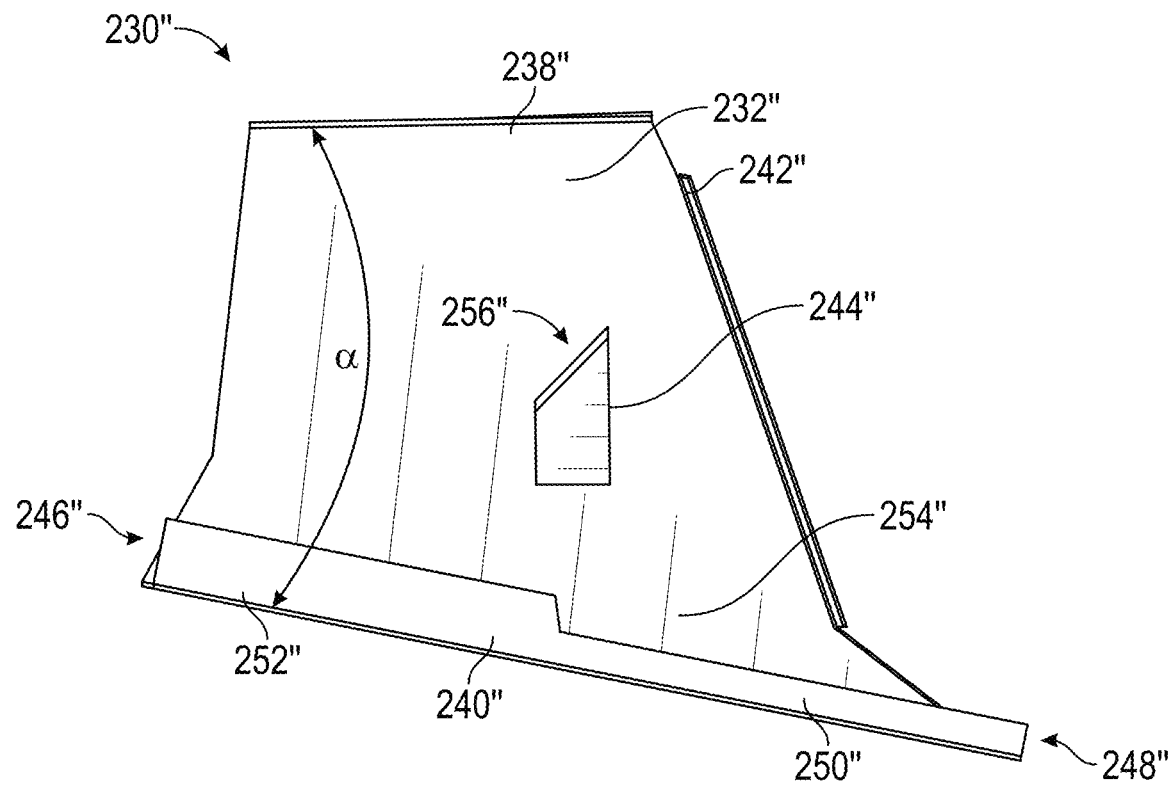
FIG. 11B depicts a rear view of the shovel of FIG. 11A.
Figure 11C:
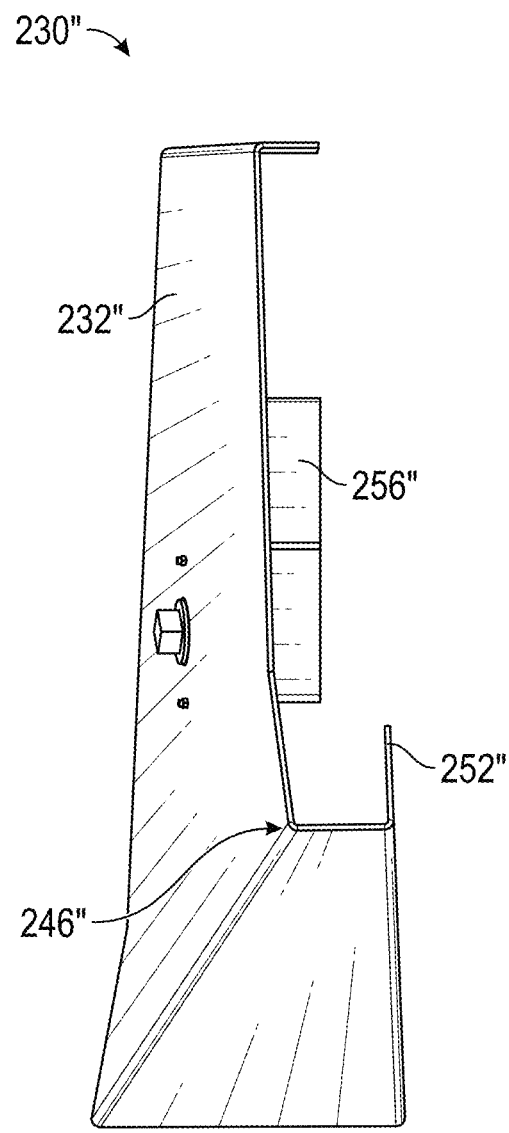
FIG. 11C depicts a first side view of the shovel of FIG. 11A.
Figure 11D:
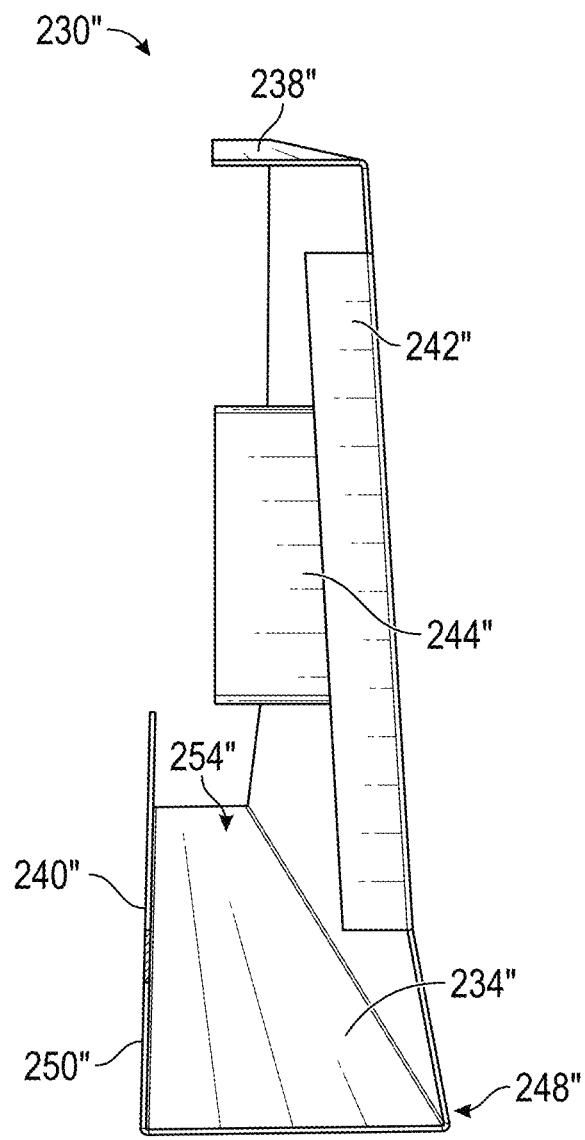
FIG. 11D depicts a second opposing side view of the shovel of FIG. 11A.
Figure 11E:
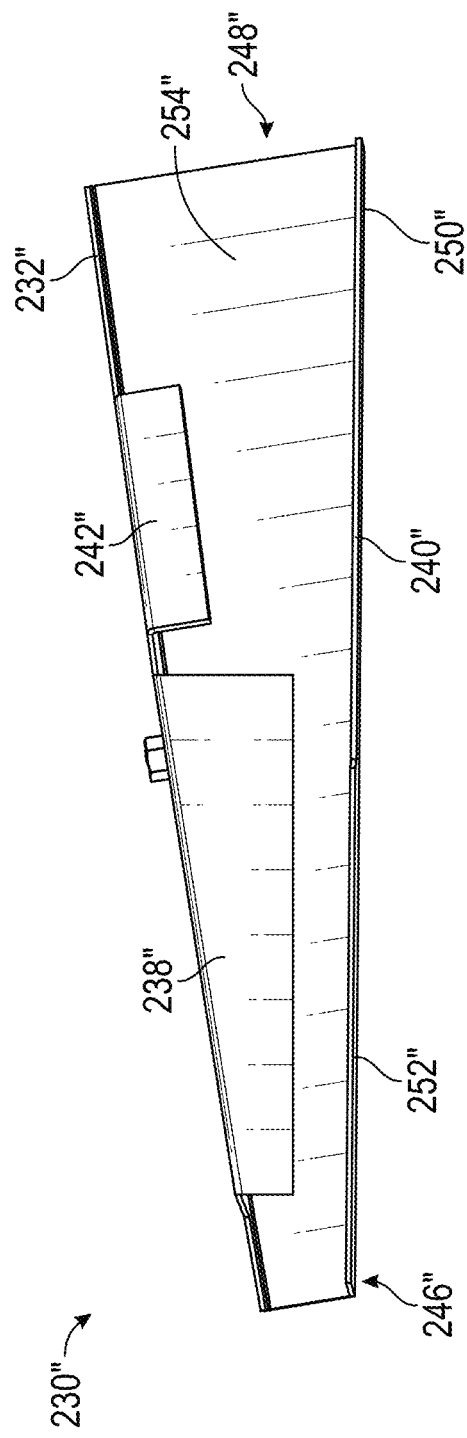
FIG. 11E depicts a top view of the shovel of FIG. 11A.
Figure 11F:
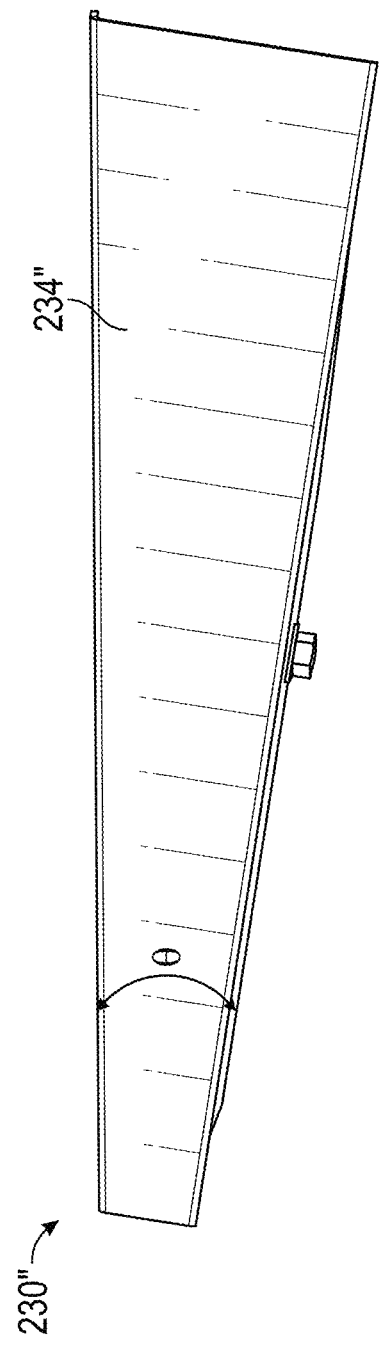
FIG. 11F depicts a bottom view of the shovel of FIG. 11A.

FIGS. 11A-11F depicts various views of a shovel 230" of the collector ring assembly 150" of FIG. 9. FIG. 11A depicts a perspective view of a shovel 230". FIG. 11B depicts a rear view of the shovel 230" of FIG. 11A. FIG. 11C depicts a first side view of the shovel 230" of FIG. 11A. FIG. 11D depicts a second opposing side view of the shovel 230" of FIG. 11A. FIG. 11E depicts a top view of the shovel 230" of FIG. 11A. FIG. 11F depicts a bottom view of the shovel 230" of FIG. 11A. Each of plurality of shovels 230" can extend from a first end 246" to an opposing second end 248". Each of the plurality of shovels 230" can include a front wall 232", a bottom wall 234", a top wall 238", a rear wall 240", a lateral lip 242", and an angled shield 244". The front wall 232" can extend from the bottom wall 234" to the top wall 238". The bottom wall 234" can extend from the front wall 232" to the rear wall 240". The front wall 232" can extend substantially perpendicular to the bottom wall 234", the top wall 238", and the lateral lip 242". The lateral lip 242" can extend from the front wall 232" towards the rear wall 240". The lateral lip 242" can extend perpendicularly from a second end 248" of the front wall 232". The lateral lip 242" can inhibit (e.g., prevent) particles P from sliding off the shovel 230" before first resting on the bottom wall 234", which can help to delay particles P on the shovel 230" until they are desired to slip out. The rear wall 240" can extend from the bottom wall 234". The rear wall 240" can extend substantially perpendicular to the bottom wall 234". As shown in 11A, the rear wall 240" can include a wide portion 252" and a narrow portion 250". The wide portion 252" can extend from a first end 246" of the shovel 230" to a position that is substantially aligned with the angled shield 244". The narrow portion 250" can extend from the wide portion 252" to the second end 248'" of the shovel 230". The size of the rear wall 240" can be maximized to prevent particles P from spilling over the shovel 230" in the rearward direction. The stepped shape of the rear wall 240" formed by the wide portion 252" and the narrow portion 250" can enable interlocking of the shovels 230".

The front wall 232", the bottom wall 234", and the rear wall 240" can form a trough 254". As shown in FIGS. 11C-11D, the trough 254" can have a substantially U-shaped channel for containing particles P. In operation, particles P can collect and build up in the trough 254" as the collector ring 200" rotates. As shown in FIG. 11F, the width of the bottom wall 234" of the trough 254" can increase (e.g., linearly) from the first end 246" to the second end 248". Accordingly, the front wall 232" can be angled from the rear wall 240" by a tray angle θ. The trapezoidal shape of the trough 254" resulting from the tray angle θ can enable the shovels 230" to be interlocking while also maximizing the amount of particles P that can be held in the trough 254" during a rotation of the collector ring 200". In some examples, the tray angle θ can be about 9 degrees. In other examples, the tray angle θ can be more than about 9 degrees or less than about 9 degrees. As shown in FIG. 11B, the trough 254'" can extend beyond the lateral lip 242" at the second end 248" of the shovel 230". This arrangement can enable the trough 254" to collect and delay any particles P that are caught by the lateral lip 242". The bottom wall 234" (and accordingly the trough 254") can be angled from the top wall 238" by a mouth angle α. The mouth angle α of the trough 254" can be tuned to optimize the friction of particles P on the trough 254" so that particles P collect during the down-swing of the collector ring 200" rotation, and particles P clear during the upswing the collector ring 200" rotation with only a thin residual layer of particles P on the trough 254" to protect from impact erosion. In some examples, the mouth angle α can be about 12.5 degrees. In other examples, mouth angle α can be more than about 12.5 degrees or less than about 12.5 degrees.

The angled shield 244" can function to direct or redirect particles P into the trough 254". As shown in FIG. 11B, the angled shield 244" can extend from the front wall 232" towards the rear wall 240". The angled shield 244" can be disposed between the top wall 238" and the bottom wall 234" such that a first gap exists between the angled shield 244" and the top wall 238", and a second gap exists between the angled shield 244" and the bottom wall 234". In some examples, the angled shield 244" can be positioned substantially centrally on the front wall 232". The angled shield 244" can include an angled surface 256". The angled surface 256" can face towards the top wall 238" and the first end 246" of the shovel 230". In some examples, the angled shield 244" can be integrally formed with the shovel 230" (e.g., as a monolithic or unitary, seamless piece). In other examples, the angled shield 244" can be a separate component that is coupled to or positioned adjacent to the shovel 230".

Figure 12:
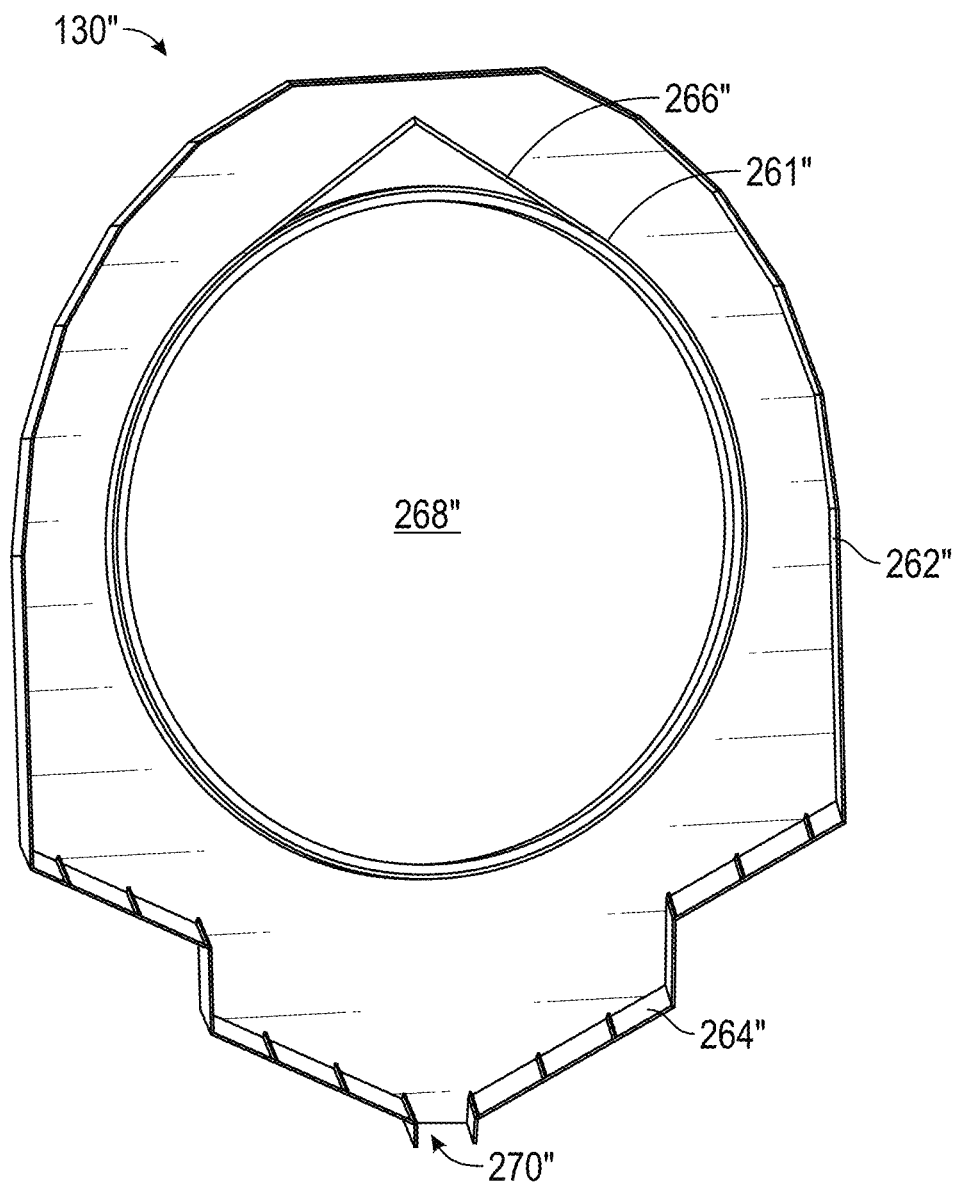
FIG. 12 depicts a transverse cross-sectional view of a shroud of the collector ring assembly of FIG. 9.

FIG. 12 depicts a transverse cross-sectional view of the shroud 130". The shroud 130" can enclose (e.g., be disposed around) the collector ring 200". The shroud 130" can remain stationary as the collector ring 200" and the inliner 120 (e.g., inliner drum) rotate. Accordingly, the collector ring 200" can rotate within the shroud 130" while the shroud 130" remains stationary. The shroud 130" can function to collect and funnel particles P exiting from the collector ring 200". The shroud 130" can include an inner sidewall 261", an outer sidewall 262", a bottom shelf 264", a top shelf 266", a central opening 268", and an exit opening 270". The inner sidewall 261" can define the central opening 268". The central opening 268" can be aligned with the opening 210" of the collector ring 200" and the aperture 110 of the receiver 100. The outer sidewall 262" can be radially spaced outward from the inner sidewall 261". The collector ring 200" can be disposed between the inner sidewall 261" and the outer sidewall 262". The top shelf 266" can extend from the inner sidewall 261" at the top region of the inner sidewall 261". The top shelf 266" can prevent a build-up of particles P on the top region of the inner sidewall 261". As shown in FIG. 12, the top shelf 266" can be shaped such that it narrows to a point (e.g., pointed edge). In some examples, the top shelf 266" can have a substantially triangular shape. The pointed edge can be aligned with a center of the shroud 130". The shape of the top shelf 266" can cause any particles P that land on the top shelf 266" to be directed to either side of the pointed edge and slide off the top shelf 266" due to gravitational pull. The side surface of the top shelf 266" can be angled at a sufficient angle to prevent particle build-up. For example, in some examples, an angle of about 70 degrees can be formed between the side surfaces of the top shelf 266".

The bottom shelf 264" can funnel particles P to a thermal storage device, exit chute, or other collection receptacle. As shown in FIG. 12, the bottom shelf 264" can extend from the outer sidewall 262". As shown in FIG. 12, the shroud 130" can include at least two opposing sloped surfaces that converge to an exit opening 270". The exit opening 270" can be disposed substantially centrally. In other examples, the shroud 130" can include only one or more than one sloped surface. Additionally, in other examples, the exit opening 270" can be offset from the center of the shroud 130" or positioned at any suitable location on the shroud 130". As shown in FIG. 12, the bottom shelf 264" can include one or more steps. The steps can function to inhibit (e.g., prevent) a large build-up of particles P on the bottom shelf 264". The steps can segment the sloped surfaces to reduce the size of any continuous flat surfaces. Reducing the size of continuous flat surfaces can reduce the size of particle piles on that surface. Specifically, the steps can be sized to optimize the size of particle piles that build-up on the bottom shelf 264". The size of the steps can be optimized to minimize the total dead mass of particle held on the bottom shelf 264" while still allowing a pile of a certain size to accumulate to help damp any particles P flung downward onto the bottom shelf 264". The particle build-up on the bottom shelf 264" can further reduce erosion of the bottom shelf 264" caused by particle impacts. In other examples, the bottom shelf 264" can include one, two, three, or any other number of steps.

Figure 13:
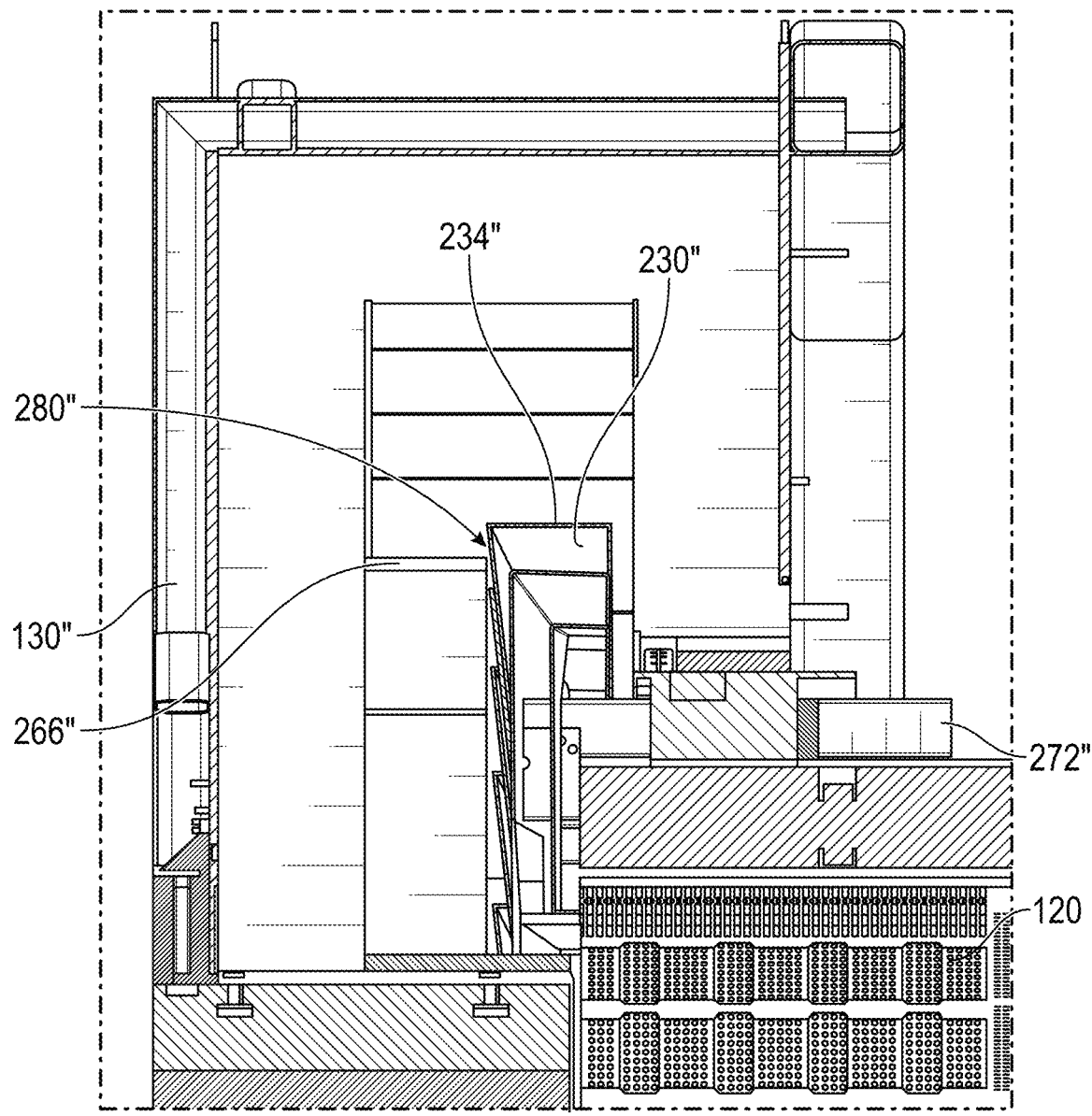
FIG. 13 depicts a partial transverse cross-sectional view of the collector ring within the shroud of FIG. 9.

FIG. 13 depicts a partial transverse cross-sectional view a collector ring 200'" within the shroud 130". As shown in FIG. 13, the shroud 130" can be disposed adjacent to the front wall 232" of each shovel 230". Each shovel 230" can be sized such that the bottom wall 234" of each shovel 230" extends radially outward from the top shelf 266" so that particles P can exit the collector ring 200" at a position that is radially outward from the top shelf 266". An axial gap 280" can be formed between the top shelf 266" and the collector ring 200" (e.g., front wall 232" of each shovel 230"). In some examples, the axial gap 280" can be about 1 cm. In other examples, the axial gap 280" can be less than 1 cm or greater than 1 cm. The axial gap 280" can inhibit (e.g., prevent) impact between the collector ring 200" and the shroud 130". Additionally, the axial gap 280" can enable looser tolerances in manufacturing and assembly of the collector ring assembly 150". In some examples, it can be preferable to minimize the size of the axial gap 280" to limit the amount of particles P that slip through the axial gap 280". As shown in FIG. 13, a support structure 272" can secure the collector ring 200" to the inliner (e.g., inliner drum) of the receiver 100. The support structure 272" can be a beam, bracket, rod, arm, or other structure capable of supporting the collector ring 200".

Figure 14:
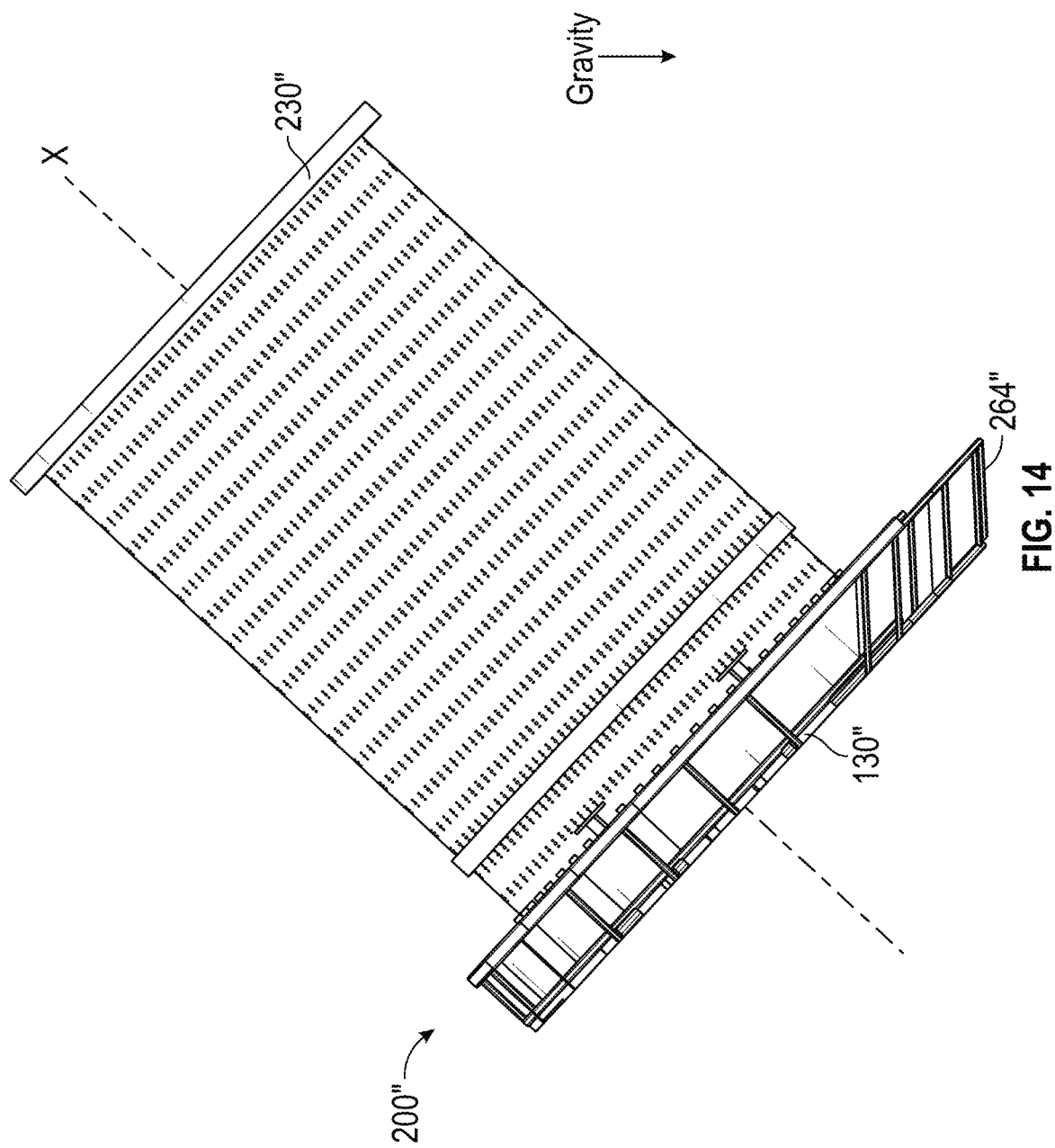
FIG. 14 depicts a side view of the collector ring assembly of FIG. 9 coupled to a receiver.

FIG. 14 depicts a side view of a collector ring assembly 150" coupled to a receiver 100. During operation, the receiver 100 can be oriented at an angle (e.g., 45-degree angle). As shown in FIG. 14, the bottom shelf 264" of the shroud 130" can be angled such that the bottom shelf 264" is oriented substantially horizontal (e.g., perpendicular to gravity) when the receiver 100 is configured in its operational orientation.

In operation of the collector ring assembly 150", the particles P move (e.g., slide) from the rear of the receiver 100 toward the front of the receiver 100 via rotation of the inliner 120. As the particles P reach the end of the inliner 120 (at the top of the rotation of the inliner drum), the particles P pass to the collector ring 200", where the shovels 230" catch and hold the particles P (e.g., without imparting any acceleration centrifugally or rotational inertia to hold the particles P against the collector ring 200"). The shovels 230" contain the particles P as they continue to spin with the inliner 120, allowing the particles P to slide on the shovel surface (e.g., on the bottom wall 234") towards the second end 248" of the shovel 230". When the particles P reach the second end 248" of the shovels 230", the particles P begin to slide off the edge of the shovels 230" due to rotational momentum and gravity direction relative to the shovel surface. The shovels 230" hold the particles P until they fall due to gravity and pass into the outlet chute 135 or exit opening 270" via the shroud 130".

FIGS. 15A-20B show sequential simulation views of the operation of the collector ring assembly 150" attached to the inliner 120 as particles P are collected by the shovels 230" and deposited into the shroud 130". FIGS. 15B, 16B, 17B, 18B, 19B, and 20B are enlarged views of regions within FIGS. 15A, 16A, 17A, 18A, 19A, and 20A, respectively. FIGS. 15A-20B depict a simulation corresponding to clockwise rotation of the receiver 100 and the collector ring 200". In other examples, the receiver 100 and collector ring 200" can rotate in a counterclockwise direction.

Figure 15A:
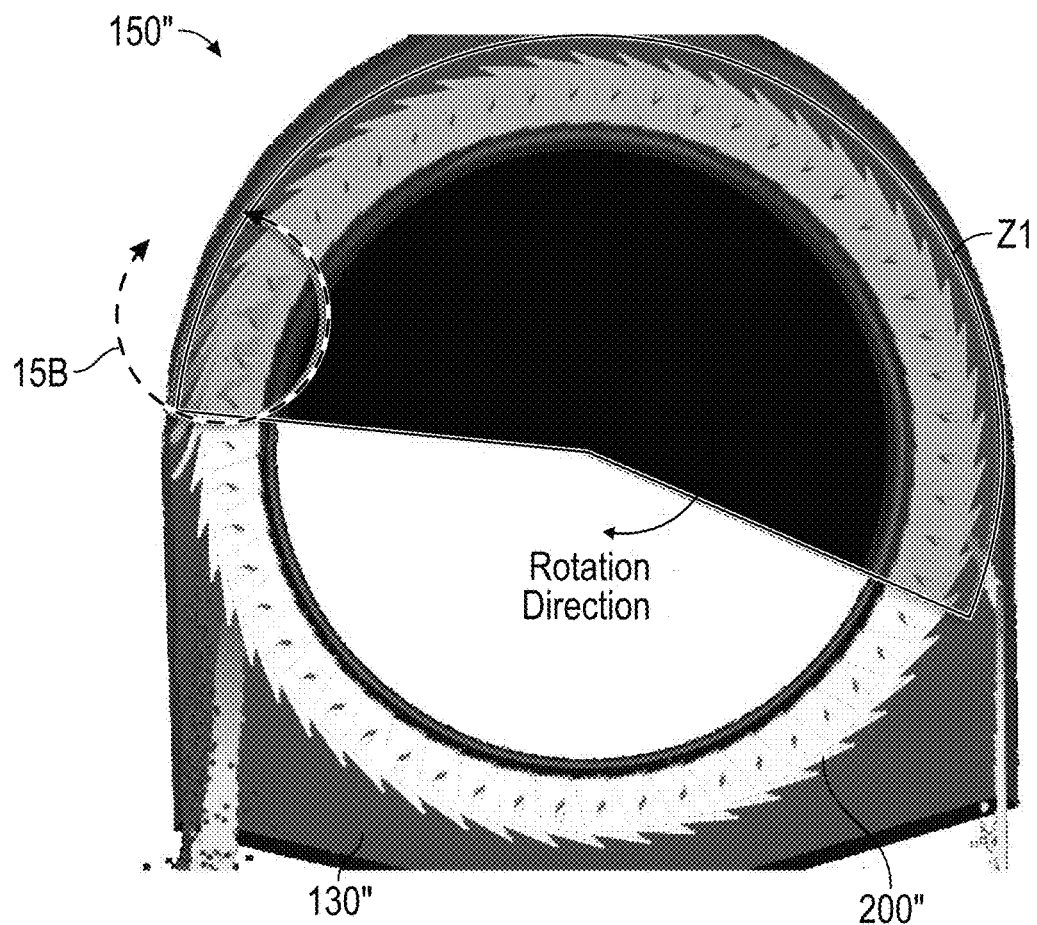
FIGS. 15A-20B show sequential simulation views of particles during operation of the collector ring assembly of FIG. 9.
Figure 15B:
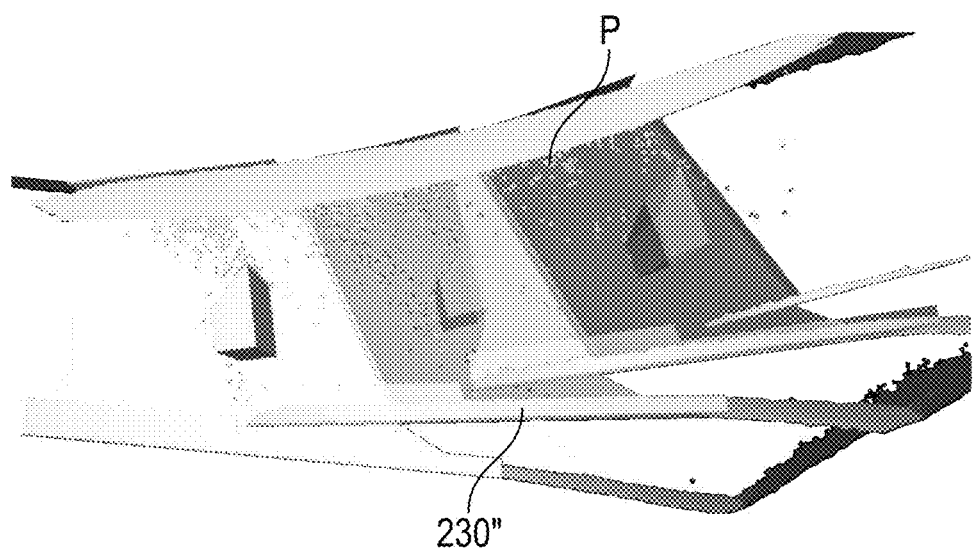

FIGS. 15A-15B depict particles P between the 9 o'clock to 10 o'clock position along the rotation cycle of the collector ring 200". As shown in FIGS. 15A-15B, particles P exit from the inliner 120 and are subsequently collected by the shovels 230" of the collector ring 200" within the zone Z1. The zone Z1 can extend between about 9 o'clock to about 4 o'clock in a clockwise direction (e.g., between about 10 o'clock and about 3 o'clock). Some of the particles P can rest on the bottom wall 234" of the shovels 230" (e.g., trough 254"), whereas other particles P can slide off the end of the trough 254".

Figure 16A:
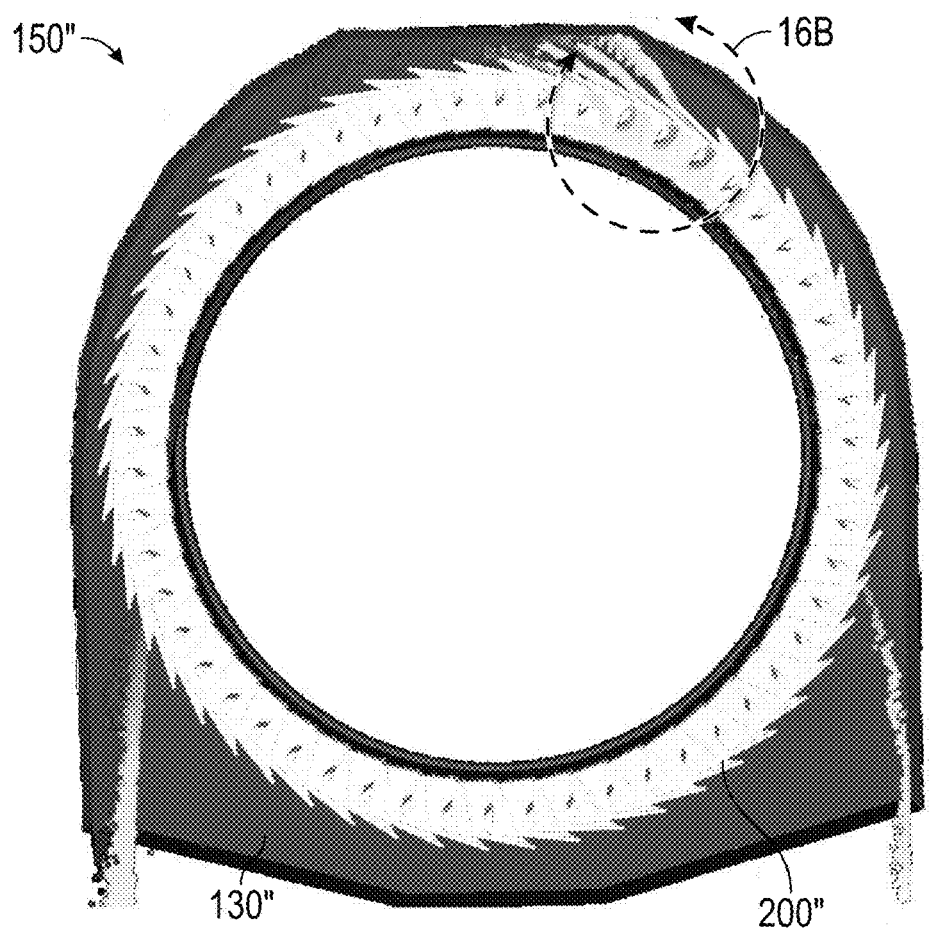
Figure 16B:
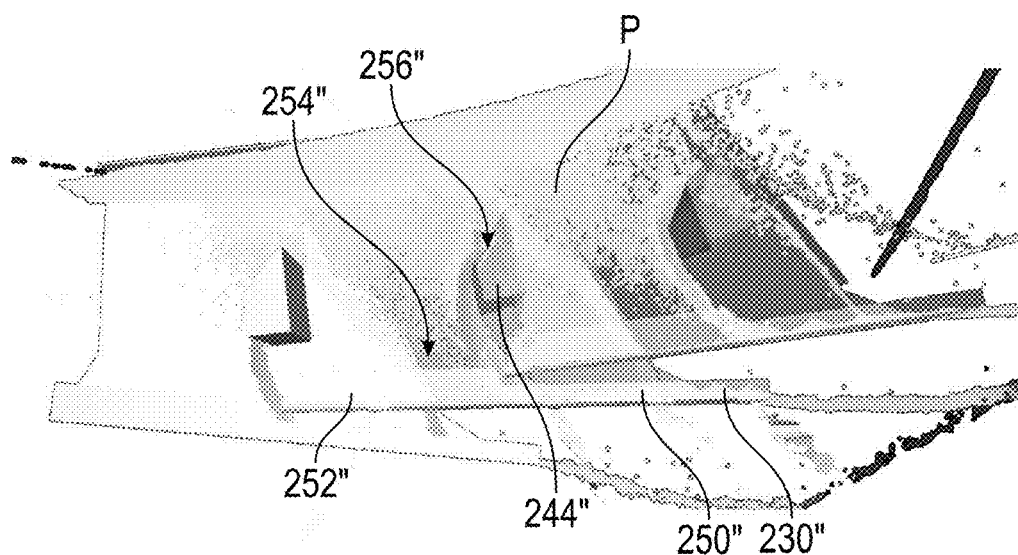

FIGS. 16A-16B depict particles P between the 12 o'clock to 1 o'clock position along the rotation cycle of the collector ring 200". FIGS. 16A-16B show travels paths of particles P entering the shovels 230". As shown in FIG. 16B, some particles P (e.g., a majority of particles P) impact the angled shield 244" and are directed to the angled side (e.g., left side in FIG. 16B) of the angled shield 244" before subsequently falling into the trough 254". Particles P directed to the angled side of the angled shield 244" fall into a middle portion of the trough 254" (e.g., at a location closer to the first end 246" of the shovel 230"). The angled shield 244" can function to decelerate (e.g., change a travel direction) of the particles P and reduce their impact velocity on the trough 254". Additionally, the angled shield 244" can function to encourage a larger build of particles P within the portion of the trough 254" having a wide portion 252" of rear wall 240". Some particles P (e.g., a minority of particle) pass over the angled shield 244" and travel to the opposing side (e.g., right side in FIG. 16B) of the angled shield 244". Particles P passing to the opposing side of the angled shield 244" impact the lateral lip 242", which directs those particles P into the trough 254". Particles P that impact the lateral lip 242" are directed into a portion of the trough 254" that is closer to the second end 248" of the trough 254". Some particles P slip out of the trough 254" against the direction of rotation. Particles P that slip out of the trough 254" have a lower speed and have been translated further out radially so that they land on top of the top shelf 266" of the shroud 130".

Figure 17A:
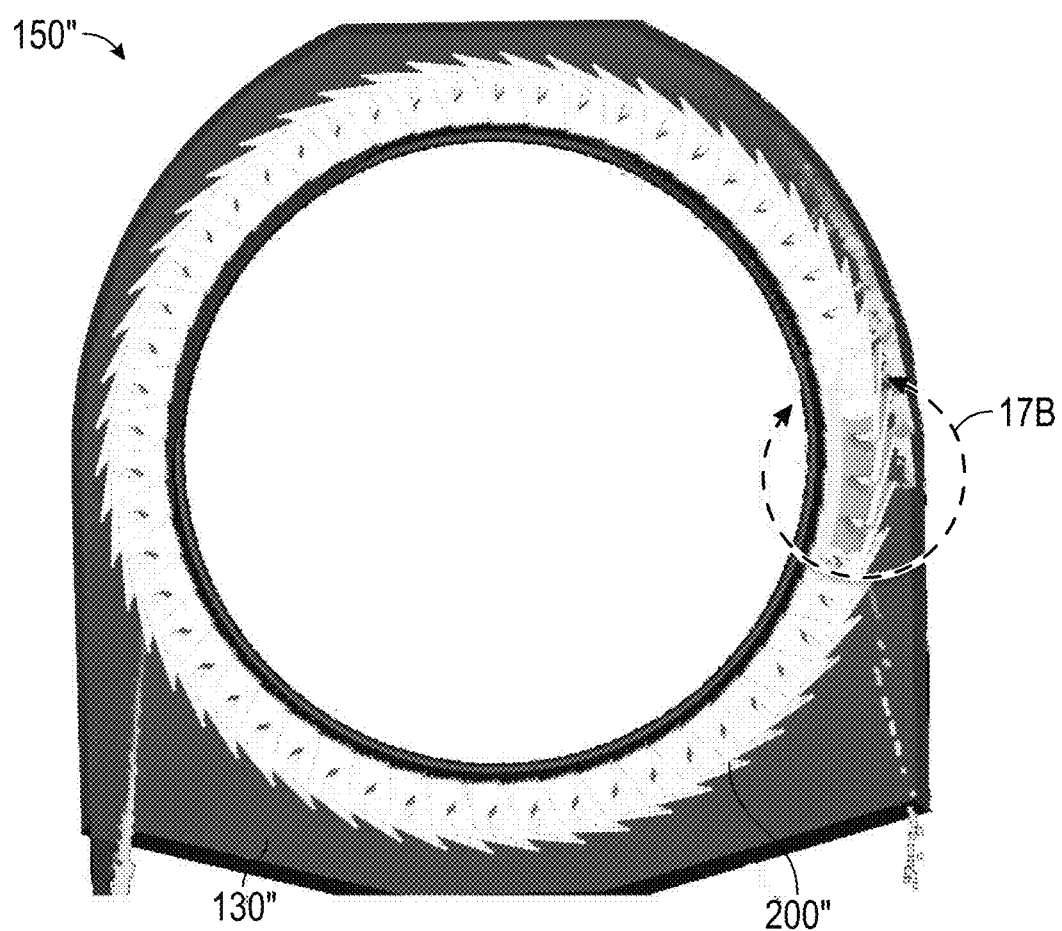
Figure 17B:
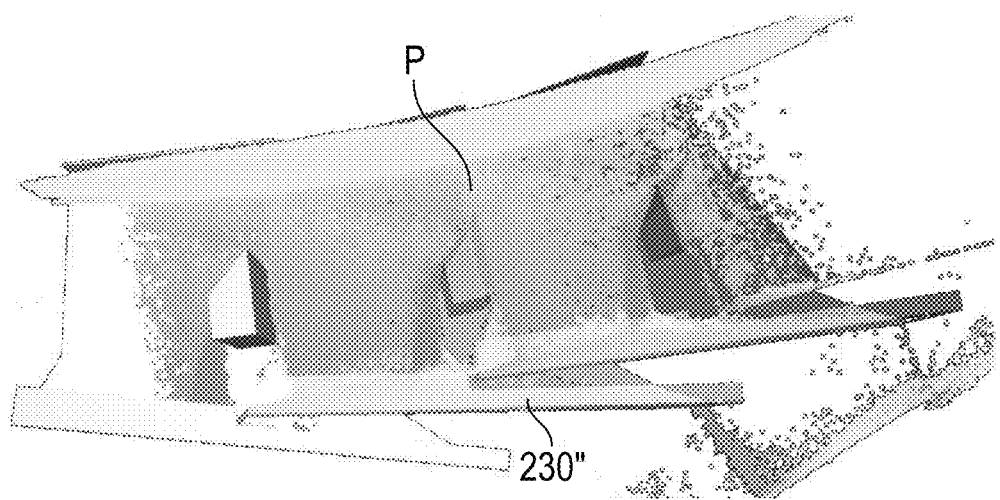

FIGS. 17A-17B depict particles P between the 2 o'clock to 3 o'clock position along the rotation cycle of the collector ring 200". As shown in FIGS. 17A-17B, particles P continue to collect in the trough 254". A larger pile of particles P can form in the region of the trough 254" that is disposed to the left (as shown in FIG. 17B) of the angled shield 244" (e.g., the portion of the trough 254" with a wide portion 252" of the rear wall 240"). At this position along the rotation cycle, flow of particles P off the inliner 120 into the collector ring 200" has decreased (e.g., mostly stopped).

Figure 18A:
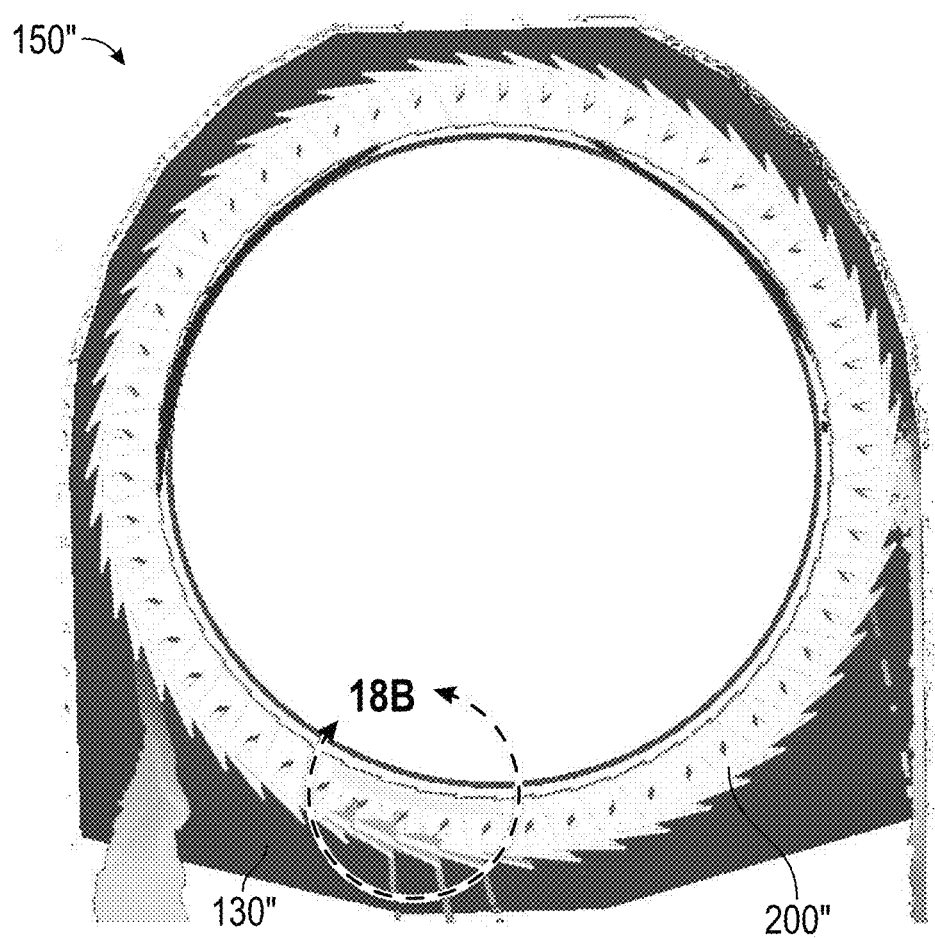
Figure 18B:
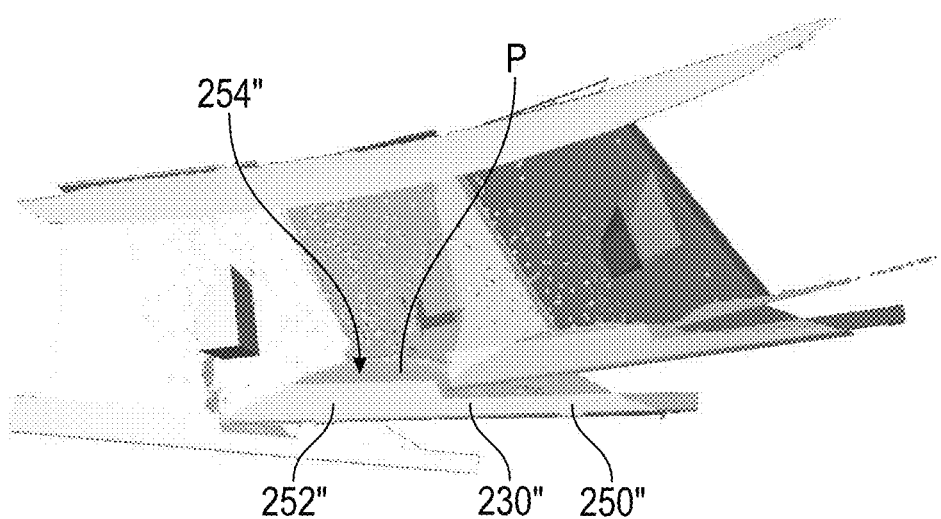

FIGS. 18A-18B depict particles P between the 6 o'clock to 7 o'clock position along the rotation cycle of the collector ring 200". As shown in FIGS. 18A-18B, at this portion of the rotation cycle particles P remain collected in the trough 254" and continue to build up. In some examples, the particles P can accumulate in each trough 254" such that each pile of particles P increases in height from the rear wall 240" to the front wall 232". In some examples, each pile of particles P can have a height at the front wall 232" that is equal to or greater than the height of the wide portion 252" of the rear wall 240". At this position along the rotation cycle, flow of particles P off the inliner into the collector ring 200" remains decreased (e.g., has mostly stopped).

Figure 19A:
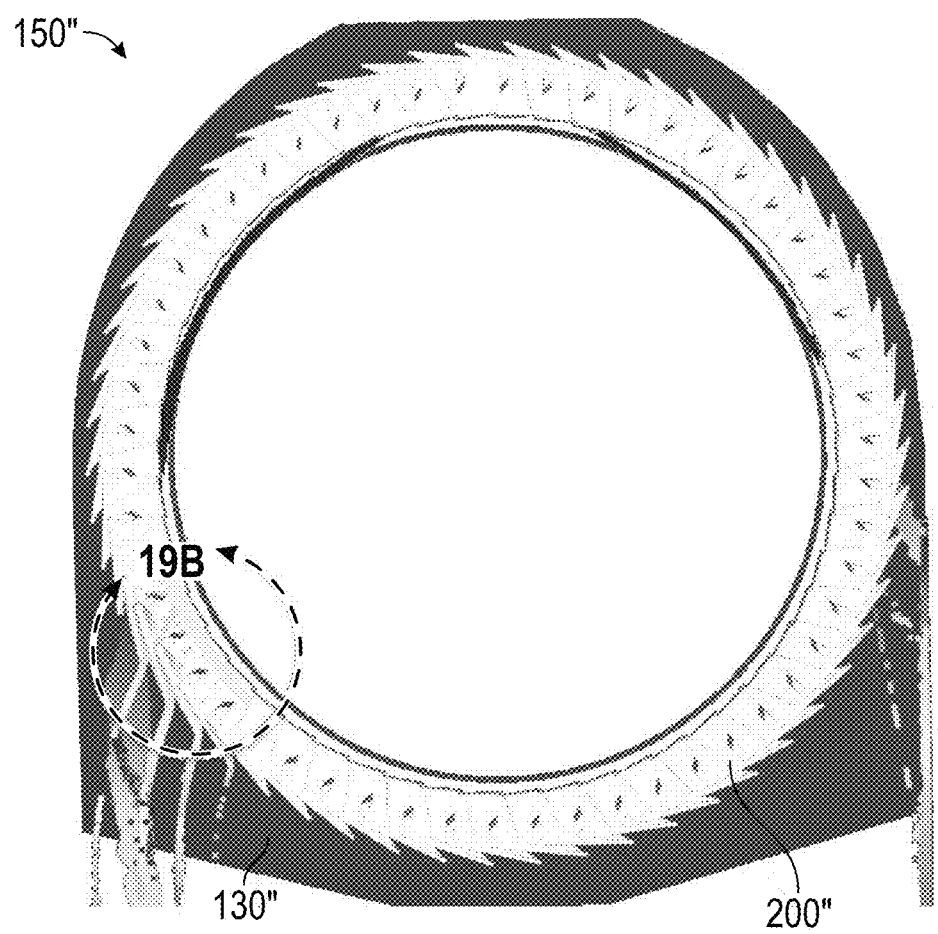
Figure 19B:
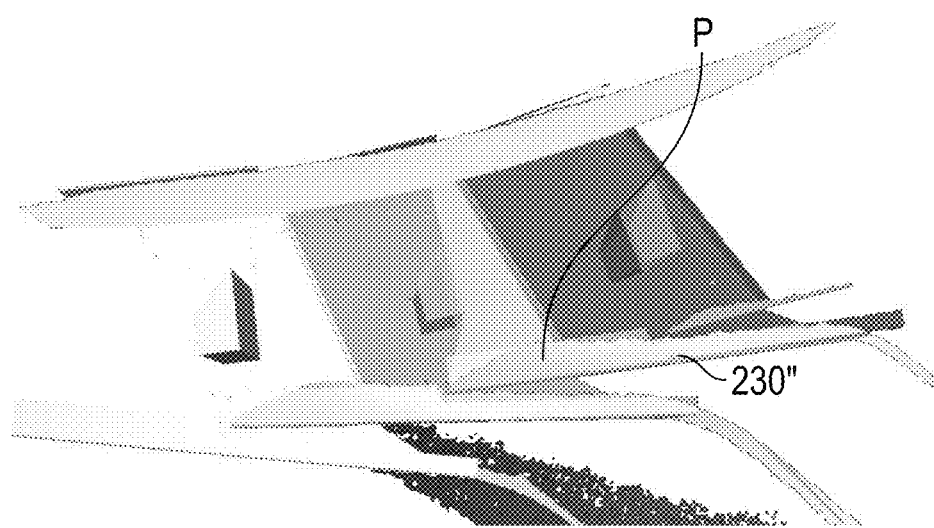

FIGS. 19A-19B depict particles P between the 7 o'clock to 8 o'clock position along the rotation cycle of the collector ring 200". As the shovels 230" start swinging upwards, gravity pulls the particles P down and starts pulling particles P out of the shovel 230". Crucially, these particles P have a lower speed than when they exited from the inliner 120 and will continue to decelerate as they continue to move against gravity. As shown in FIGS. 19A-19B, the pile of particles P can start to diminish in size as particle leave the shovel 230".

Figure 20A:
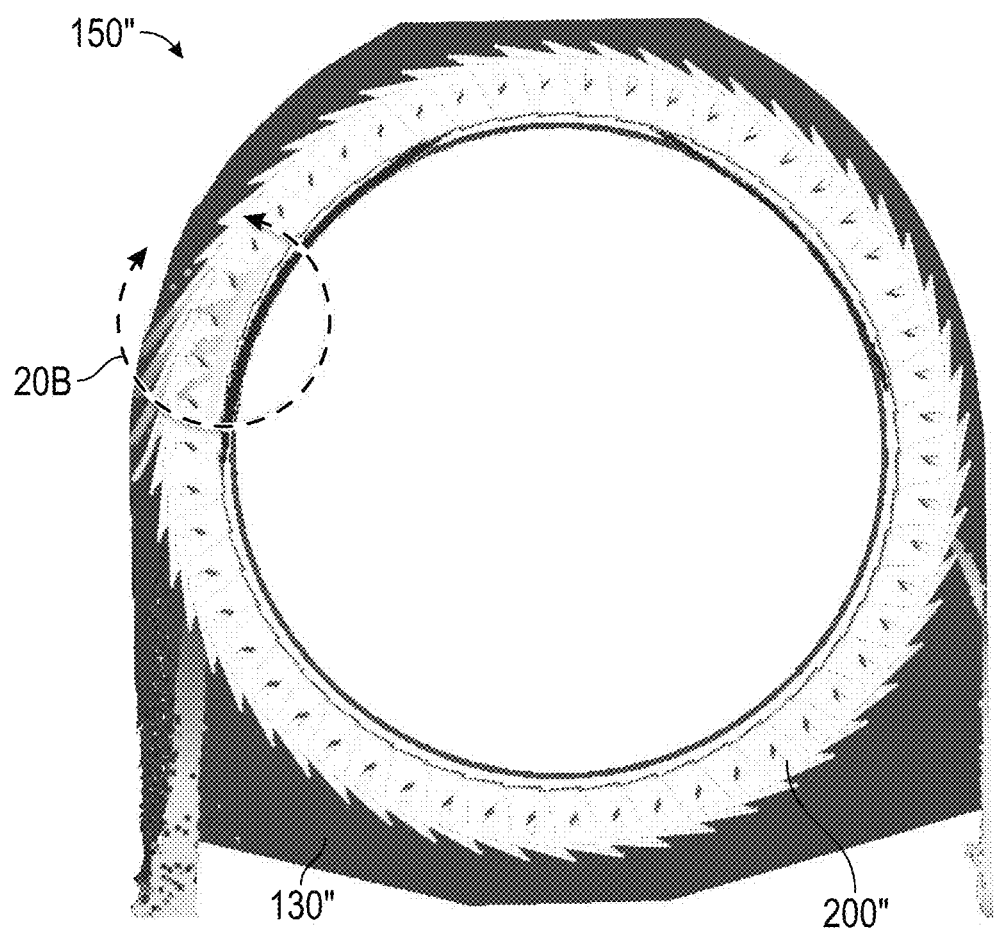
Figure 20B:
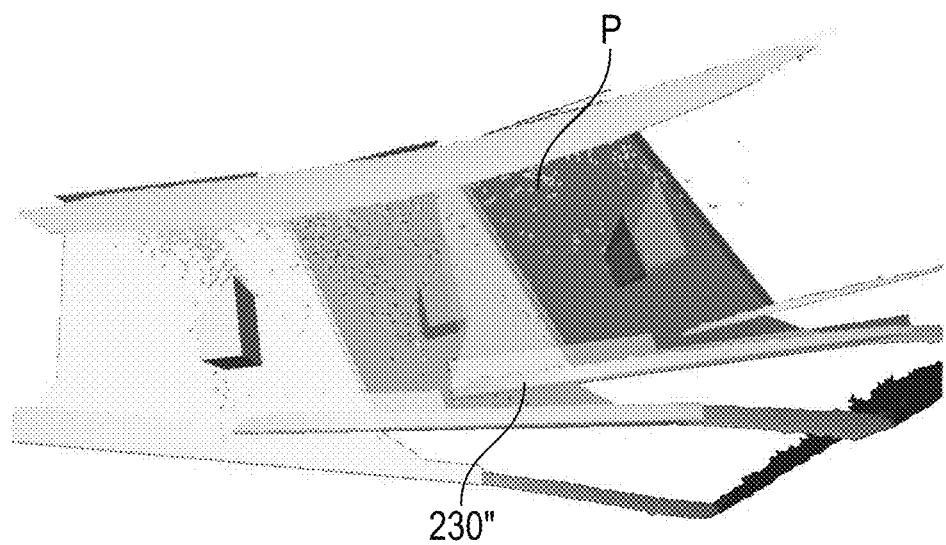

FIGS. 20A-20B depict particles P after completing a full rotation cycle and returning to the 9 o'clock to 10 o'clock position of the rotation cycle of the collector ring 200". As shown in FIGS. 20A-20B, after completing a full rotation cycle of the collector ring 200", the original particles P have been mostly cleared from the shovel 230" as new particles P start flowing in. The mouth angle α of the trough 254" is tuned so that a small layer of particles P remains on the trough 254". The remaining layer of particles P can function to damp the impact of incoming particles P and reduce wear on the shovels 230". As shown in FIGS. 15A-20B, particles P can exit (e.g., be released from or fall out of the shovels 230" between about 6 o'clock and about 9 o'clock along the rotation cycle of the collector ring 200". Particles P exiting from the shovels 230" of the collector ring 200" can be captured by the shroud 130" and funneled to the exit opening 270".

Advantageously, the collector ring 200, 200', 200" can function to slow down particles P exiting from the receiver 100, and reduce their impact velocities. The collector ring 200, 200', 200" can utilize gravity and drag to slow down particles. Advantageously, a reduction in impact velocities of the particles can reduce wear and tear on the collector ring 200, 200', 200" and attrition of the particles, thereby reducing operation and maintenance cost. Further, the particles can be preferentially deposited off of the vanes 230 or shovels 230', 230" onto a mound of particles, eliminating wear on the walls of the shroud 130, 130". Additionally, the collector ring 200, 200', 200" reduces (e.g., minimizes) particle buildup, which allows for the reduction in the size of the collector ring 200, 200', 200", which can in turn allow for an increased size of the aperture 110 of the receiver 100.

In operation, the inliner 120 can rotate about the central longitudinal axis X of the receiver 100 and be oriented at an angle (e.g., 45 degree angle). Particles (e.g., carbo-ceramic particles, such as sintered bauxite, coated sand particles) are introduced proximate an upper end of the receiver and onto the inliner 120 (e.g., onto inliner panels). Centrifugal force holds the particles against the inliner panels and the surface features inhibit rolling of the particles on the inliner panels. The particles slide relative to each other as sunlight is directed to the receiver, causing the particles to heat to temperatures of 600-900° C. or higher (e.g., 1000° C. or higher). The heated particles exit the receiver via the inliner into the collector ring 200, 200', 200" as described above. Once the particles P are collected via the outlet chute 135, the particles can in one example be directed to a thermal storage location (e.g., a thermal storage tank), where the heated particles can be stored for use in various industrial applications.

Figure 21:
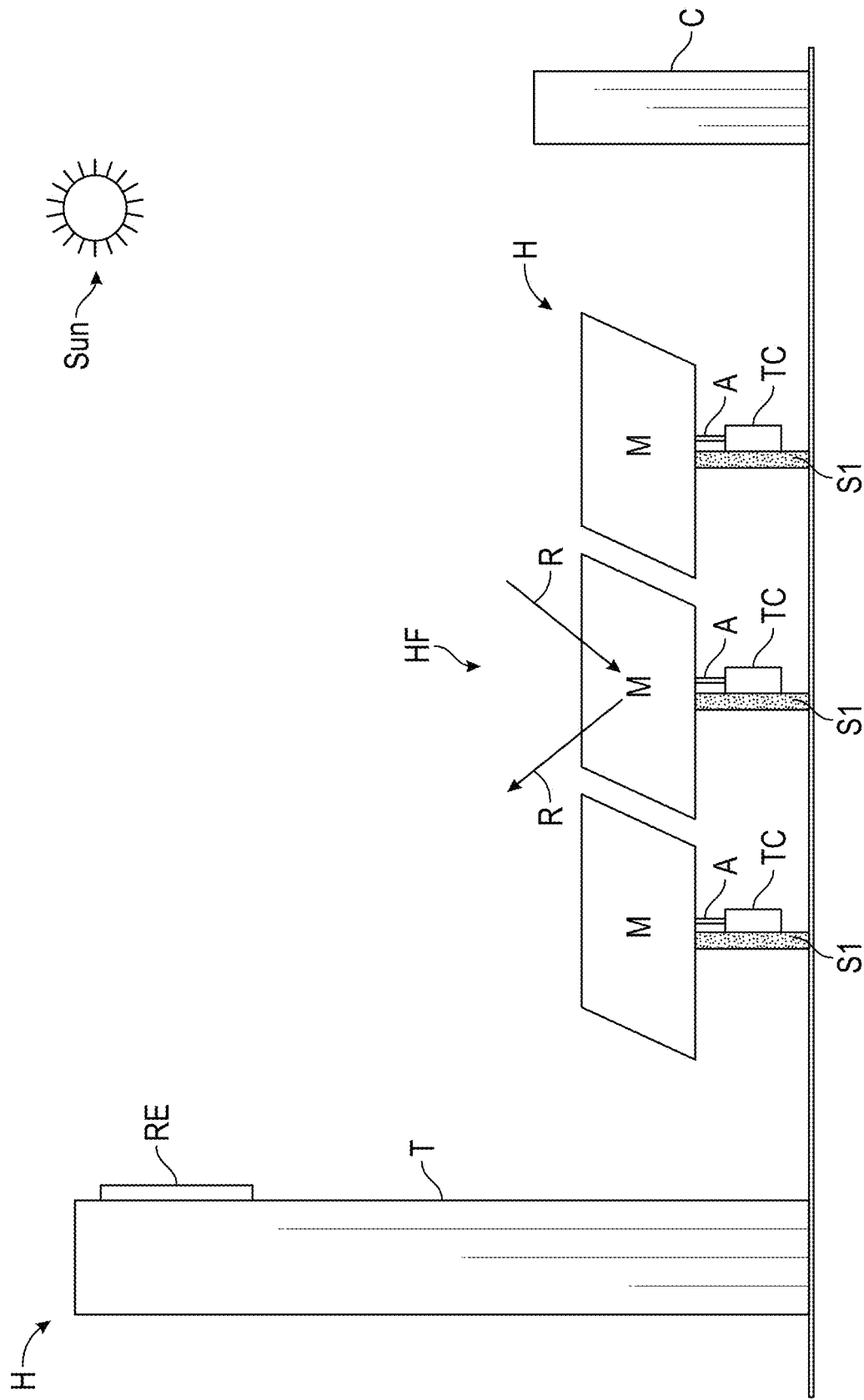
FIG. 21 is a schematic view of a receiver tower and heliostats that direct reflected sunlight toward the receiver tower.

A receiver system, such as the receiver 100 with the collector ring 200, 200', 200", can be located on a roof of a building or top of a tower and exposed to sunlight (e.g., reflected sunlight) directed from below the receiver system (e.g., in a manner that captures 80-90% of sunlight onto the receiver 100 of the receiver system). FIG. 21 shows one example of a concentrated solar power (CSP) system that can be used with the receiver system disclosed herein. The CSP system can include a heliostat field HF with one or more heliostats H supported on shafts or frames S1. Each heliostat H can have a tracking controller TC and an actuator A and a mirror M. The mirrors M can reflect sunlight to one or more receiver apertures RE (e.g., similar to apertures 110 of the receiver 100) in a tower T. The tower T can have a housing H at the top thereof that houses the receiver system. A controller C can control the heliostat field HF (e.g., control the heliostats H).

While certain examples of the inventions have been described, these examples have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect or example are to be understood to be applicable to any other aspect or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing examples. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some examples, the actual steps taken in the processes illustrated and/or disclosed may differ from those shown in the figures. Depending on the example, certain of the steps described above may be removed, others may be added. Furthermore, the features and attributes of the specific examples disclosed above may be combined in different ways to form additional examples, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular example. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain examples include, while other examples do not include, certain features, elements, and/or steps. Thus, such conditional language is not generally intended to imply that features, elements, and/or steps are in any way required for one or more examples or that one or more examples necessarily include logic for deciding, with or without user input or prompting, whether these features, elements, and/or steps are included or are to be performed in any particular example.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain examples require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain examples, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred examples in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Of course, the foregoing description is that of certain features, aspects and advantages of the present invention, to which various changes and modifications can be made without departing from the spirit and scope of the present invention. Moreover, the devices described herein need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of examples may be made and still fall within the scope of the invention. Accordingly, it should be understood that various features and aspects of the disclosed examples can be combined with or substituted for one another in order to form varying modes of the discussed devices.

What is claimed is:

1. A collector ring for a centrifugal solar receiver, the collector ring comprising a plurality of collection members arranged circumferentially about a central longitudinal axis of the collector ring, wherein the plurality of collection members are configured to capture particles and reduce a speed of the particles;
   wherein the plurality of collection members comprises a plurality of shovels, each of the plurality of shovels comprising: a front wall; a bottom wall extending from the front wall; and a rear wall extending from the bottom wall, wherein the front wall, the bottom wall, and the rear wall define a trough configured to collect particles;
   wherein the plurality of shovels are configured to receive and collect particles from the centrifugal solar receiver when the plurality of shovels are positioned between about 9 o'clock about 4 o'clock along a clockwise rotation cycle of the collector ring, and wherein the plurality of shovels are configured to release particles when the plurality of shovels are positioned between about 6 o'clock and about 9 o'clock along the clockwise rotation cycle of the collector ring.

2. The collector ring of claim 1, wherein each of the plurality of shovels further comprise: an angled shield extending from the front wall, the angled shield comprising an angled surface, wherein the angled shield is configured to direct particles into the trough; a lateral lip extending from the front wall, wherein the lateral lip is configured to capture particles that travel past the angled shield and direct those particles into the trough; and a top wall extending from the front wall.

3. The collector ring of claim 2, wherein the rear wall comprises a wide portion and a narrow portion.

4. The collector ring of claim 2, wherein each of the plurality of shovels is configured to receive particles travelling in a direction from a first end of the shovel to a second end of the shovel, wherein the lateral lip is disposed at the second end of the shovel.

5. The collector ring of claim 2, wherein the bottom wall, the top wall, and the lateral lip each extend substantially perpendicular to the front wall.

6. The collector ring of claim 2, wherein the top wall is angled from the bottom wall by a mouth angle of about 12.5 degrees.

7. The collector ring of claim 1, wherein each of the plurality of shovels is at least partially nested within an adjacent shovel.

8. The collector ring of claim 1, wherein the rear wall is angled from the front wall by a tray angle of about 9 degrees.

9. The collector ring of claim 1, further comprising a stationary shroud disposed around the collector ring, the stationary shroud configured to collect and funnel particles exiting from the collector ring.

10. The collector ring of claim 9, wherein the stationary shroud comprises a pointed top shelf and a stepped bottom shelf.

11. The collector ring of claim 1, wherein the collector ring is configured to rotate with a rotating inliner drum of the centrifugal solar receiver.

12. The collector ring of claim 1, wherein the plurality of collection members comprises a plurality of curved vanes.

13. The collector ring of claim 12, further comprising:
an end wall; and
a front wall defining an opening aligned with an aperture of the centrifugal solar receiver, wherein the front wall is angled towards the central longitudinal axis of the collector ring, wherein the front wall is spaced from an inliner of the centrifugal solar receiver to form a circumferential gap between the front wall and the inliner via which particles flow from the inliner into the collector ring.

14. A collector ring assembly for a centrifugal solar receiver, the collector ring assembly comprising:
a collector ring configured to capture particles from the centrifugal solar receiver and reduce a speed of the particles, the collector ring comprising a plurality of shovels arranged circumferentially about a central longitudinal axis of the collector ring, each of the plurality of shovels comprising:
a front wall;
a bottom wall extending from the front wall; and
a rear wall extending from the bottom wall, wherein the front wall, the bottom wall, and the rear wall define a trough configured to collect particles; and
a stationary shroud disposed around the collector ring, the stationary shroud configured to collect and funnel particles exiting from the collector ring, the stationary shroud comprising a pointed top shelf and a stepped bottom shelf.

15. The collector ring assembly of claim 14, wherein each of the plurality of shovels further comprise:
an angled shield extending from the front wall, the angled shield comprising an angled surface, wherein the angled shield is configured to direct particles into the trough;
a lateral lip extending from the front wall, wherein the lateral lip is configured to capture particles that travel past the angled shield and direct those particles into the trough; and
a top wall extending from the front wall.

16. A collection member of a collector ring for a centrifugal solar receiver, the collection member comprising:
a front wall;
a bottom wall extending from the front wall;
a rear wall extending from the bottom wall, the rear wall comprising a wide portion and a narrow portion, wherein the front wall, the bottom wall, and the rear wall define a trough configured to collect particles;
an angled shield extending from the front wall, the angled shield comprising an angled surface, wherein the angled shield is configured to direct particles into the trough;
a lateral lip extending from the front wall, wherein the lateral lip is configured to capture particles that travel past the angled shield and direct those particles into the trough; and
a top wall extending from the front wall.

17. The collection member of claim 16, wherein the collection member is configured to receive particles travelling from a first end of the collection member to a second end of the collection member, wherein the lateral lip is disposed at the second end of the collection member.

18. The collection member of claim 16, wherein the bottom wall, the top wall, and the lateral lip each extend substantially perpendicular to the front wall.

* * * * *